US009152900B1

(12) United States Patent
Santiago

(10) Patent No.: US 9,152,900 B1
(45) Date of Patent: Oct. 6, 2015

(54) QSL CARD CONFIRMATION SYSTEM AND METHOD OF USING THE SAME

(71) Applicant: Carlos L. Santiago, Caguas, PR (US)

(72) Inventor: Carlos L. Santiago, Caguas, PR (US)

( * ) Notice: Subject to any disclaimer, the term of this patent is extended or adjusted under 35 U.S.C. 154(b) by 0 days.

(21) Appl. No.: 14/289,645

(22) Filed: May 28, 2014

(51) Int. Cl.
*G06F 3/12* (2006.01)
*G06K 15/00* (2006.01)
*G06F 17/30* (2006.01)
*G06Q 30/00* (2012.01)
*G06K 15/02* (2006.01)

(52) U.S. Cl.
CPC ...... *G06K 15/4095* (2013.01); *G06F 17/30424* (2013.01); *G06F 17/30595* (2013.01); *G06K 15/021* (2013.01); *G06Q 30/0185* (2013.01)

(58) Field of Classification Search
None
See application file for complete search history.

(56) References Cited

U.S. PATENT DOCUMENTS

| | | | |
|---|---|---|---|
| 7,653,690 B2 * | 1/2010 | Block | 709/206 |
| 2002/0154327 A1 * | 10/2002 | Jones | 358/1.12 |
| 2004/0073555 A1 * | 4/2004 | Hevener | 707/100 |
| 2005/0125497 A1 * | 6/2005 | Hevener | 709/205 |

* cited by examiner

*Primary Examiner* — Dung Tran
(74) *Attorney, Agent, or Firm* — Hoglund & Pamias, PSC; Roberto J. Rios

(57) ABSTRACT

The invention automatically generates a QSL card, a template previously loaded, when an electronic confirmation of the contact between two stations matches each other logbooks. The card can only be obtain in a print fashion via online printers previously registered, and the card can not be saved in any place outside the server before the confirmation between both stations. The QSL cards are coded with ID serial numbers and traceable through commercial printers and personal printers services to prevent any fraud. The invention provides a more robust QSO Confirmation System, taken advantages of the best technologies available today while maintaining a very important radio amateur tradition.

76 Claims, 40 Drawing Sheets

FIG. 5
QSL Card and Label Format Layout
(Not scale drawings)
4 x 6" Photo
(QSL Card Artwork)
Label type and position will be determine by the Card owner
4 x 6" Photo
(QSL Card Artwork)
Avery 8252
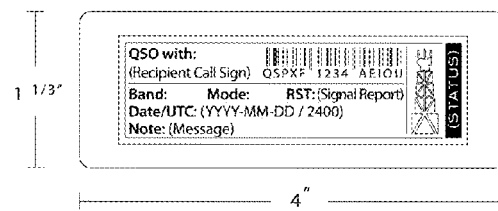

FIG. 6

Page size 8.5 x 11" (US Letter)
Maximum of 20 QSLs per page.

FIG. 10
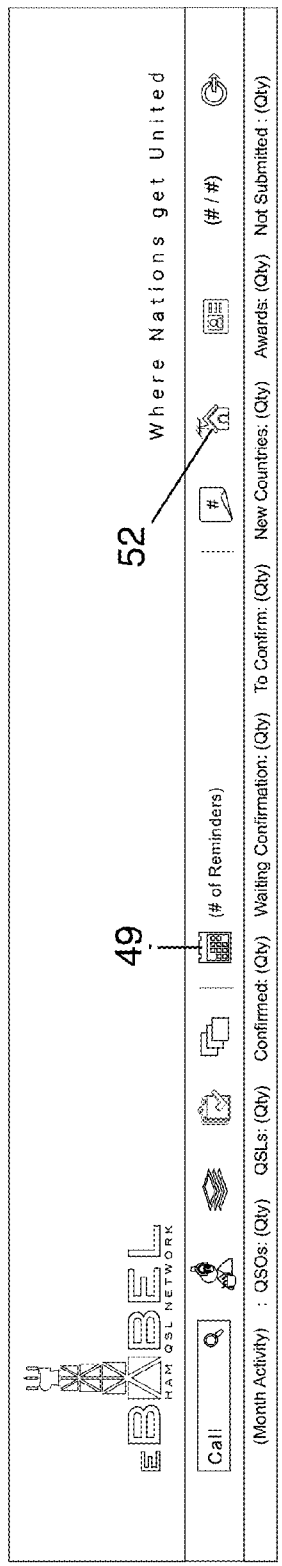
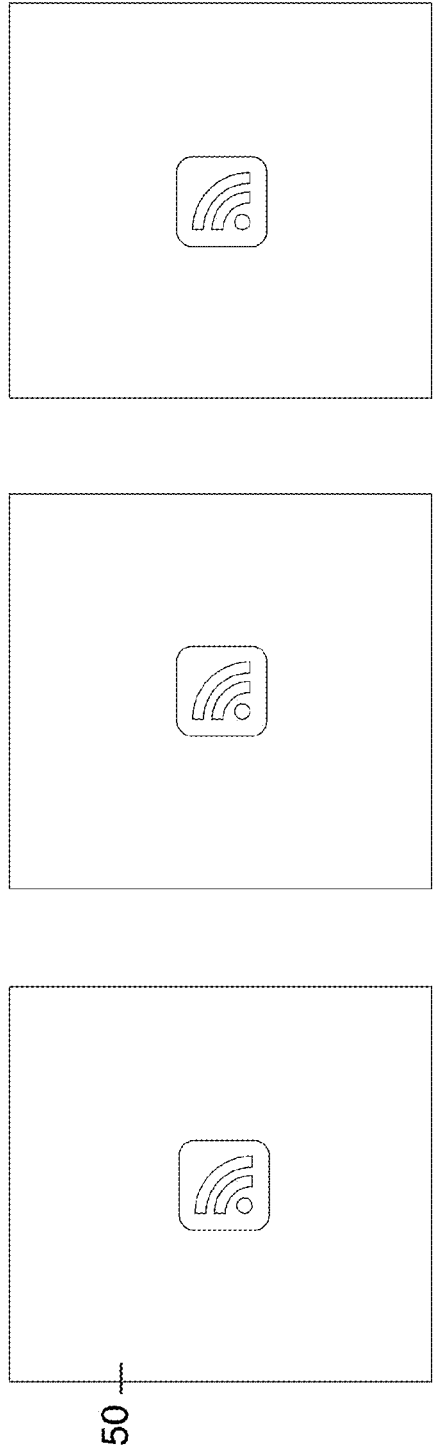
51 — Take Complete Control Over Your QTH Page Content

FIG. 19a
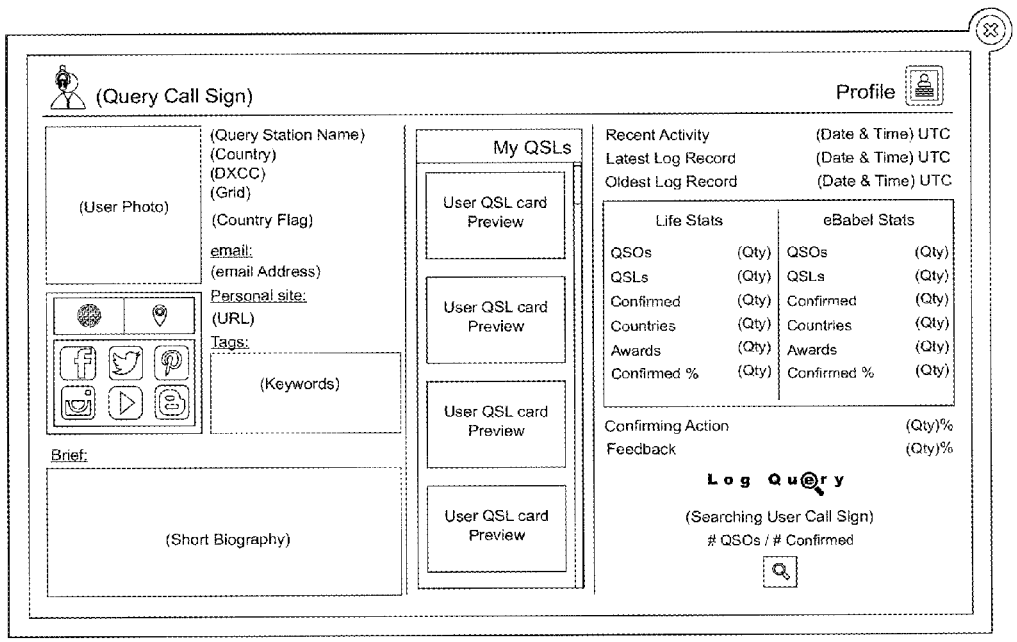
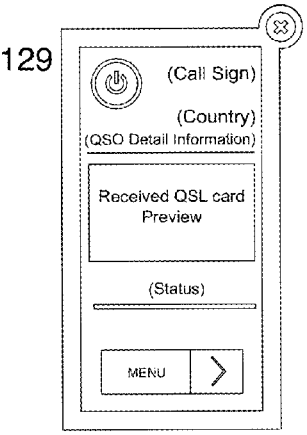

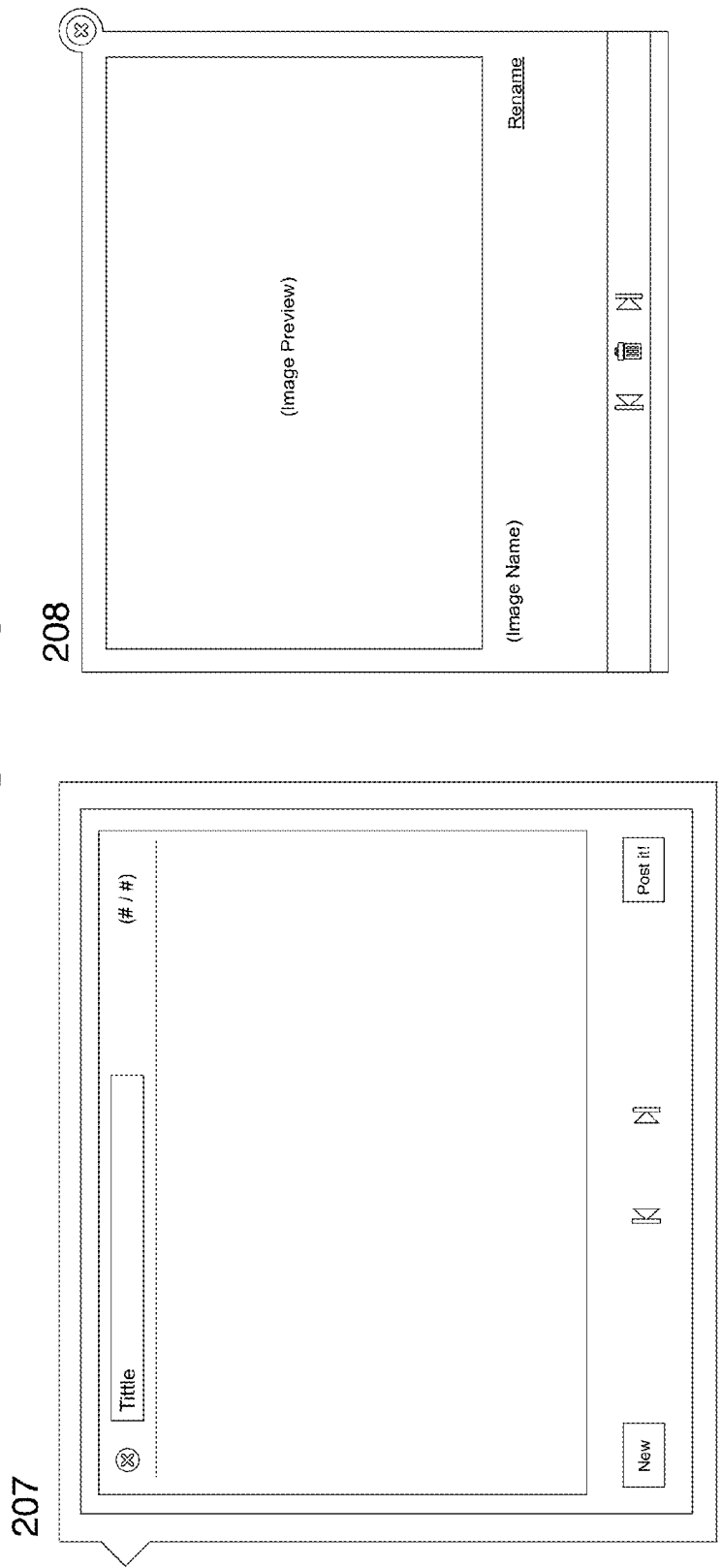

FIG. 25a

QSL CARD CONFIRMATION SYSTEM AND METHOD OF USING THE SAME

BACKGROUND OF THE INVENTION

There are two existing methods for a radio contact confirmation between two amateur radio stations (the term use is "QSL"—Can you acknowledge receipt?), the QSL card exchange traditionally by mail or QSL bureau (a group voluntary Amateur Radio Operators around the world, QSL Managers) and the electronic logbook match up in a database system. For example, Logbook of The World (LoTW), the American Radio Relay League (ARRL) online system, make this electronic matching and confirm the contact. However, a QSL post card is not sent. Traditionally the QSL post card by mail service or QSL Bureau was the method of confirmation of a radio contact (QSO) between amateur stations. Sometimes, it takes years to receive a QSL card by mail or Bureau and in many occasions the stations have to send money to the other station to pay for the mailing process.

The QSL card is a very desirable item by most of the amateur radio operators around the world because it is a solid evidence of their achievements and thus, it has become an integral part of the hobby tradition. The QSL card is a piece of evidence that lasts for a lifetime, a piece of other country, other culture and a collectible item.

Alternatively, with the use of the electronic log match came the digital QSL postcard exchange (like eQSL.cc does online), wherein the users have the ability to send and receive a digital QSL card when a log match takes place. This digital QSL card can be downloaded and managed in a local computer of the users. However, this generates a problem of fraud and fake confirmations due to the advancement in digital manipulation now a day. For that reason, the ARRL and many other Radio Organizations does not recognize the eQSL system cards to be a valid confirmation method to obtain any award granted by these organizations. If the user wants to submit this cards for award purposes, the granting organizations have to print the cards and send it back to the sending station for signing and then submit it for awards.

Also, is a very common for simulating a QSO confirmation practice to obtain the accounts security username, passwords and certificates software. Thus, many stations around the world are hesitant to use any of these two systems because of the security issues, the lack of quality, complexity and poor offering in terms of choices.

Thus, what is needed is a simple yet secure QSL confirmation system that allows the exchange of confirmed and valid QSL cards between two users that allows printing and exchanging QSL cards while at the same time providing a fraud-free submission and certification system.

BRIEF DESCRIPTION OF THE DRAWINGS

Further features and advantages of the invention will become apparent from the following detailed description taken in conjunction with the accompanying figures showing illustrative embodiments of the invention, in which:

FIG. 5 illustrates various cards and labels formats of the system according to the present invention.

FIG. 6 illustrates a report template of the system according to the present invention.

FIG. 10 illustrates a User Homepage Section screen of the Graphical User Interface (GUI) of the system according to the present invention.

FIG. 19a illustrates floating windows opened from the Desktop Section Archive Tab layout window of the Graphical User Interface (GUI) of the system according to the present invention.

FIG. 20 illustrates the Desktop Section Activity Tab layout window of the Graphical User Interface (GUI) of the system according to the present invention.

FIG. 21a illustrates various windows opened from the Desktop Section Logger Tab layout window of the Graphical User Interface (GUI) of the system according to the present invention.

FIG. 22 illustrates the Desktop Section Awards Tab layout window of the Graphical User Interface (GUI) of the system according to the present invention.

FIG. 24a illustrates windows opened from the ShackWall User Setup Section layout window of the Graphical User Interface (GUI) of the system according to the present invention.

FIGS. 25 and 25a illustrate the User Account Info Section layout window of the Graphical User Interface (GUI) of the system according to the present invention.

Throughout the figures, the same reference numbers and characters, unless otherwise stated, are used to denote like elements, components, portions or features of the illustrated embodiments. The subject invention will be described in detail in conjunction with the accompanying figures, in view of the illustrative embodiments.

DETAILED DESCRIPTION OF THE INVENTION

Figure 1:
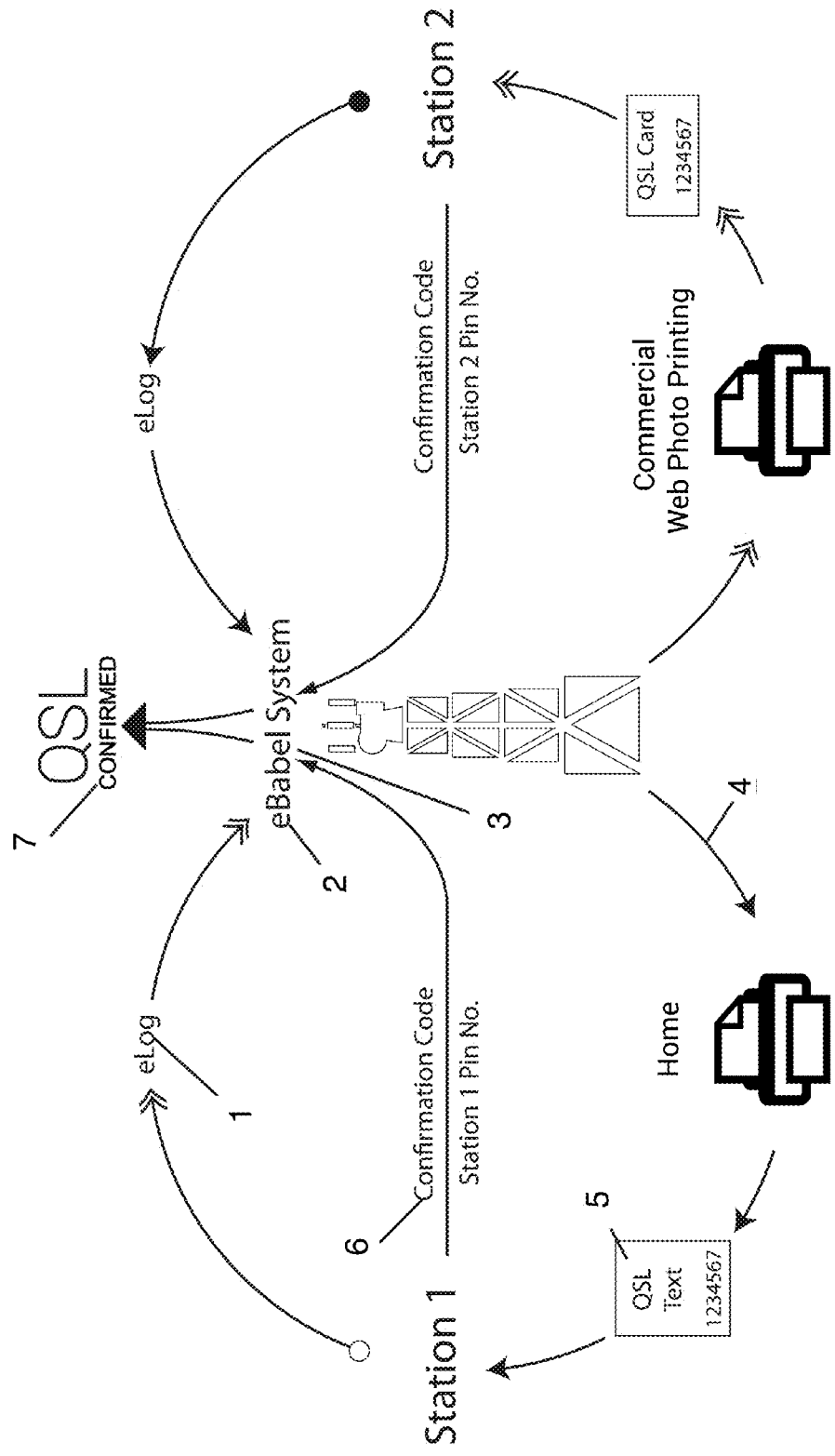
FIG. 1 illustrates the general operation of system according to the present invention.

The general operation of the invention will be explained with reference to FIG. 1. Both Station 1 and Station 2 have been previously registered with the eBabel system 2 and have valid accounts. Therefore, their respective electronic logbooks 1 detailing all their contacts and communications were uploaded to the System in ADIF (Amateur Data Interchange Format) format. The system performs a matching operation via a Matching Mechanism Module where Log records in the database are automatically compared looking for matching entries between two stations. The matching criteria by both participating stations to be searched and compared by the system are: 1) Stations call signs, 2) band (radio frequency), 3) operating mode, and 4) Date and Time (UTC) of the contact with a maximum of 30 minutes of difference between records. The matching process is transparent to both of the two stations concerning a QSO so that no log entry or confirmation status can be seen before the match takes place. Once the match is positive the QSL cards are generated automatically by the system and transferred and migrated to the Manager section of each user within the system. One important feature of the invention is that the user can extract the QSL card via the Internet directly to a network-connected printer. Additionally, the QSL card could be directed to a personal or commercial printer.

The QSL information provided by the system could be obtained in different formats such as but not limited to: 4"×6" photo format, Avery™ Standard Label 8252, 8162, 5162 and a 8.5"×11" Text Report Format sheet. In accordance with a novel feature of the invention, a confirmation code is provided in each QSL printed document (the same for both documents). Once the Confirmation code is provided to the user in the printed card, the Confirmation code must be submitted back to the system in order to authenticate the QSL exchange process. To avoid any fraudulent or illegitimate action the confirmation number is complemented with a four digits encrypted personal pin number previously set by the user. Thus, a user submits to the system the confirmation number along with the four digits encrypted personal pin number. After the system receives the information sent by the user the QSL confirmation is granted by the system and the QSL process ends by the confirmation of both stations. Now a digital QSL card could be downloaded to a computer and printed if desired.

Figure 1A:
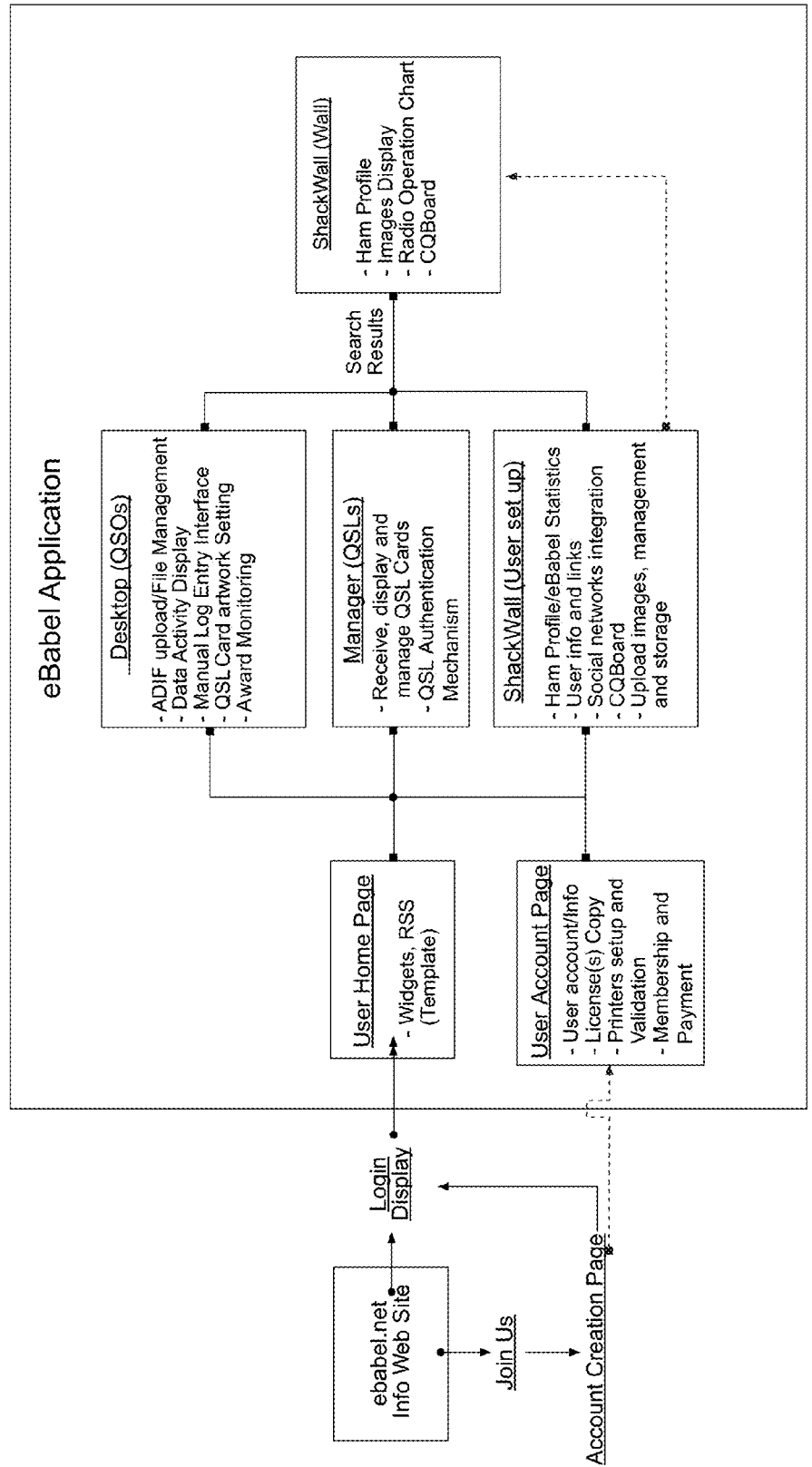
FIG. 1a illustrates a detailed operation of system according to the present invention.

In operation, each station uploads its respective eLog 1 to the eBabel System 2 and begins the QSL confirmation process using a User Interface that follows the directions described in FIG. 1a. Once the System matches the eLog 1 of both stations a confirmation code is generated and independently sent to print within a QSL card to a network-connected printer 4. Both users then enter the confirmation code 5 into the system along with a Pin number 6. Finally, the System 2 matches both confirmation codes 5 in a step defined by the reference number 3 and proceeds to confirm the QSL communication 7. As previously mentioned, FIG. 1a describes a preferred implementation of the User Interface for the method and system of the present invention.

Figure 2:
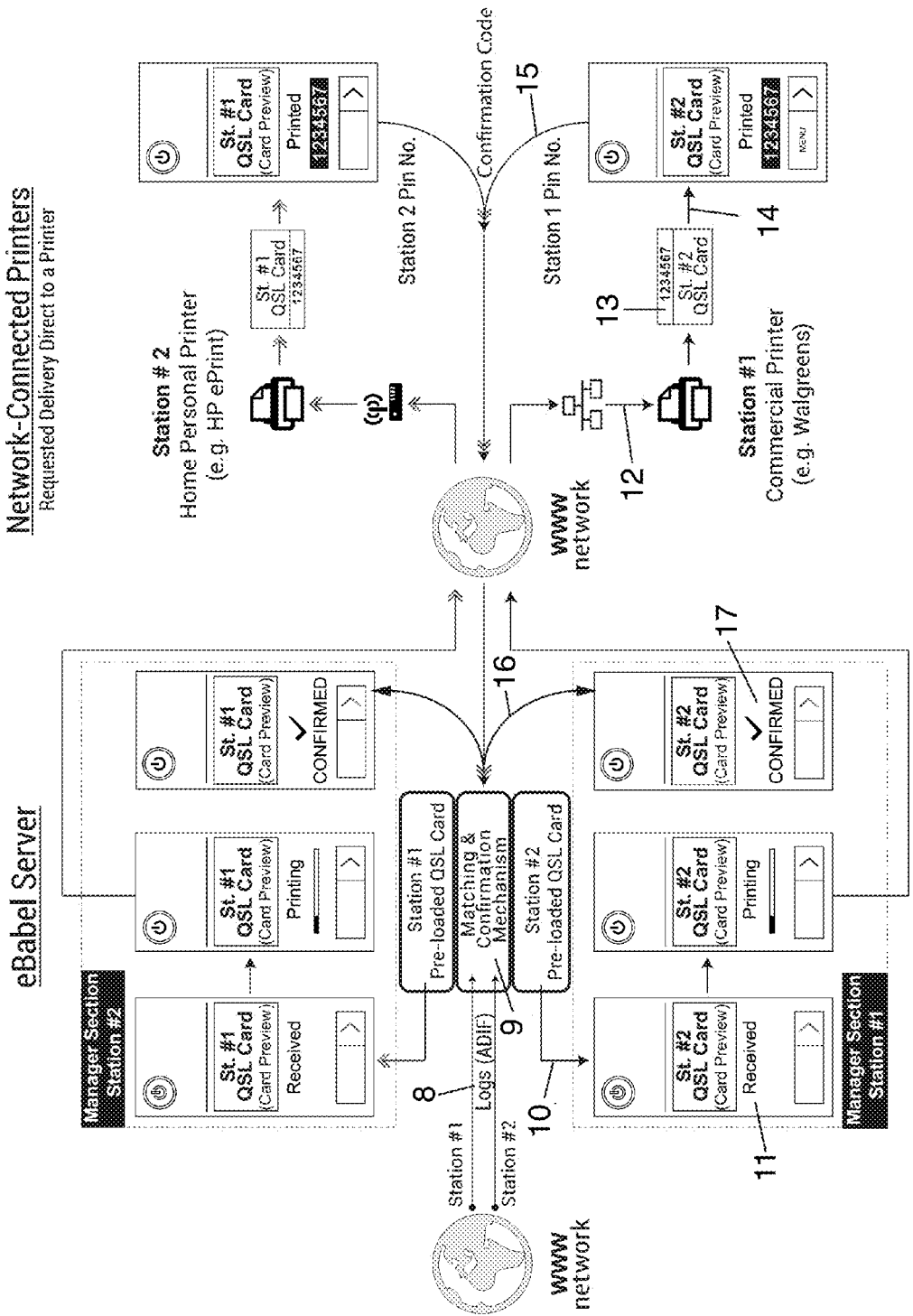
FIG. 2 shows the QSL authentication process of the system according to the present invention.

The QSL authentication process of the invention will be explained in more detail with reference of FIGS. 2 and 3. As previously explained, both stations have validated accounts and the electronic logbooks 8 were uploaded to the System in ADIF format. Log records in the database are automatically compared looking for matching entries and when a match is found a first validation 9 is determined. Afterwards, the QSL cards are generated automatically by the system and migrated to the Manager section 10 of each user within the system. A card preview (thumbnail) is displayed in a Micro Manager Unit of the system where the QSL card will be managed 11 until final confirmation. If a Confirmation Code is not available the Micro Manager Unit will show the actual status of the different steps of the transaction until a Confirmation code is available and final confirmation is determined. The user extracts the card though the Internet 16 directly to a network-connected printer 12, where a second validation occurs. At this point the QSL label will show a "PENDING" status. As previously explained, the same confirmation code 13 will be available in Both QSL printed document 14 sent to Station 1 and Station 2. The Confirmation Code is then submitted 15 to the system in order to authenticate the QSL exchange process. A third validation occurs when a user submits the Confirmation Code along with a complimentary four digits encrypted personal pin number previously set by the user. The QSL confirmation is granted by the system and the QSL process ends by the confirmation of both stations. However, if one of the stations does not submit the Confirmation Code the Micro Manager Unit will show a "Waiting Confirmation" status until the other station finish the process. Once the QSL is finally confirmed by the system the Micro Manager Unit shows a "CONFIRMED" status 17. The digital QSL card could be downloaded to a computer or re-printed showing this time the "CONFIRMED" status in the QSO label.

Figure 3:
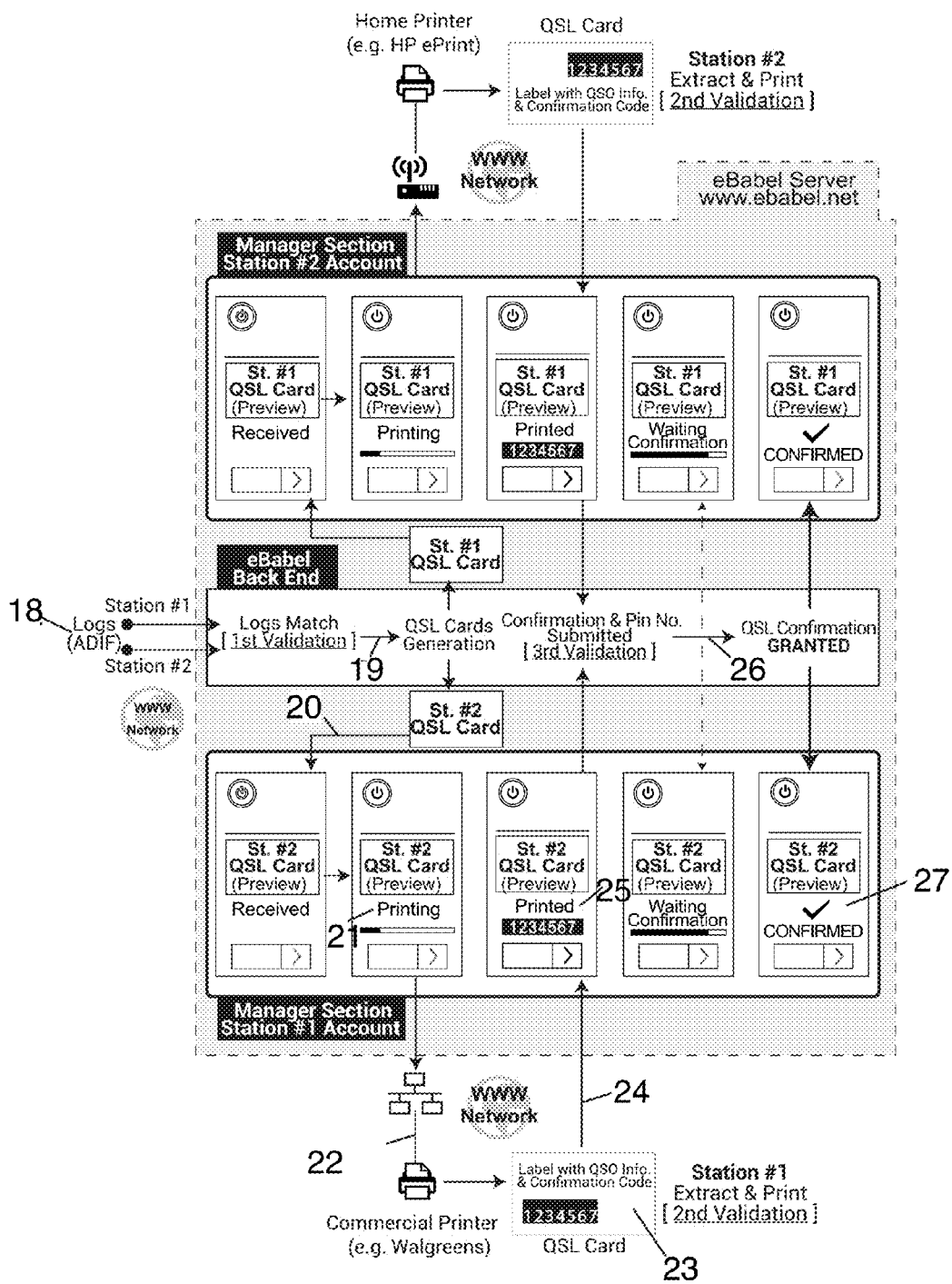
FIG. 3 shows another illustration of the QSL authentication process of the system according to the present invention.

FIG. 3 also illustrates the invention from a System backend perspective. A user uploads the logs 18 to the system and once a first match is made the system proceeds to generate the QSL cards at 19 and send a QSL card to a manager section of each station at 20. Once the card is received the user sends at step 21 the QSL card to print at a network-connected printer 21. The printed QSL card 23 contains a confirmation which the user uploads to the system at step 24. The system will provide confirmation that the card was in fact printed and the confirmation code uploaded at 25. Once the system confirms at 26 that both stations generated and printed the cards and uploaded the confirmation code to the system a final confirmation is provided at step 27.

Figure 4:
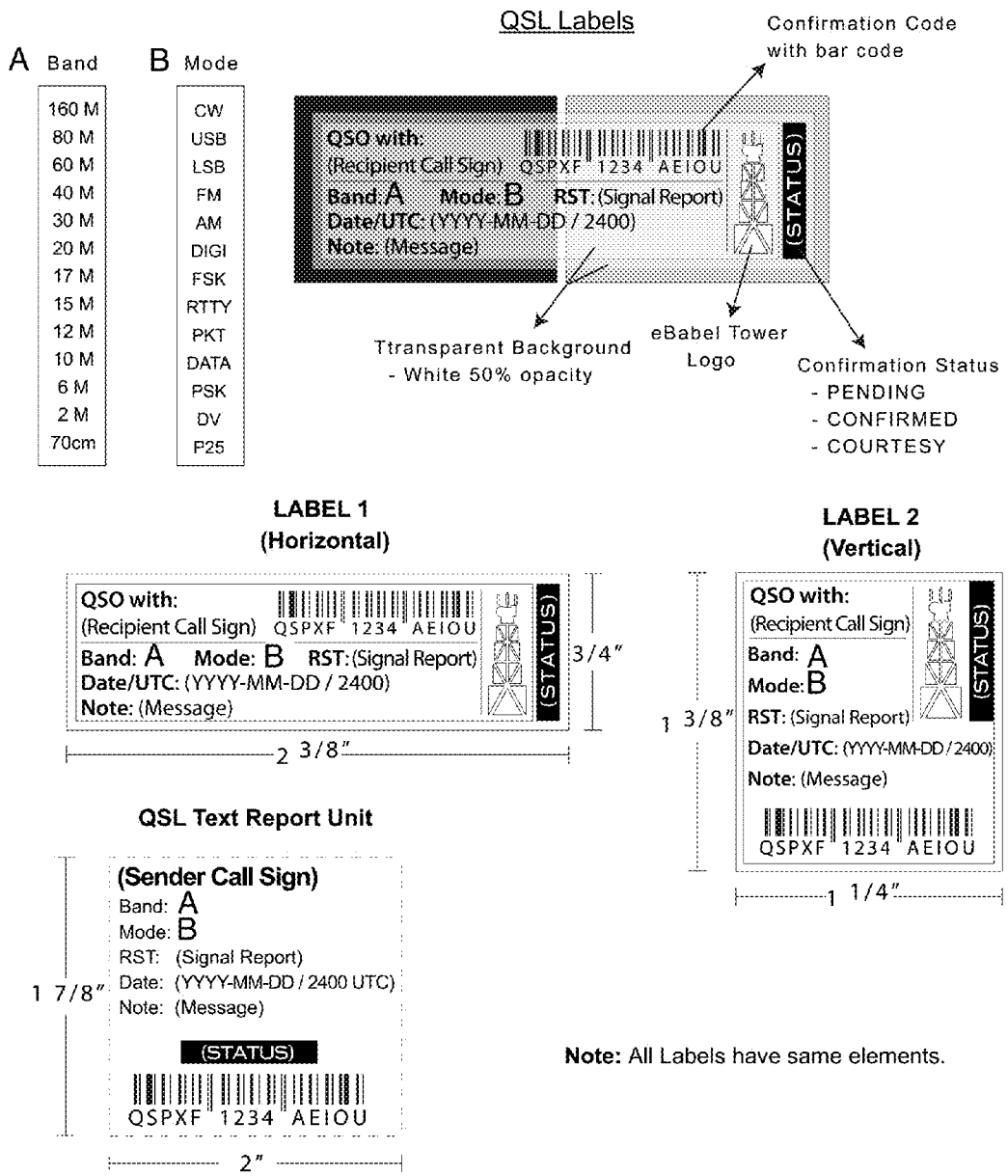
FIG. 4 illustrates various labels and reports of the system according to the present invention.
Figure 6:
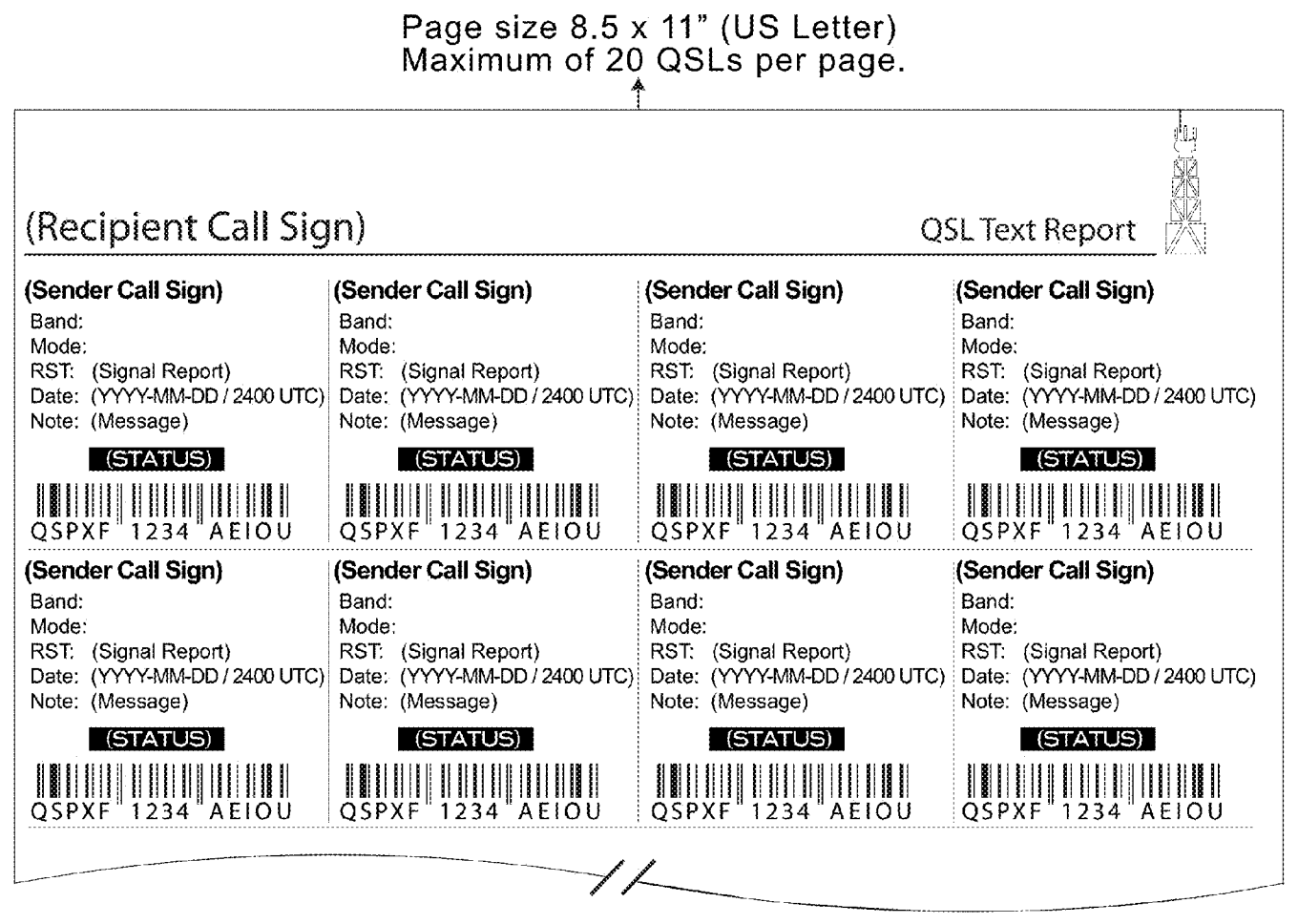

FIGS. 4, 5 and 6 illustrate the various labels and reports that can be provided and printed by the system of the present invention. The QSL labels will show the specific band and mode where the communication took place along with a Recipient Call Sign ID. Other information is provided such as but not limited to: Date/UTS, RST and a Note or Message. In addition, the Confirmation code (if available) along with a barcode is provided. The status of the confirmation at the time of printing (i.e., PENDING, CONFIRMED or COURTESY) is also provided. A courtesy label is a label that is only provided as a courtesy and a QSL confirmation is not necessarily needed or requested. As illustrated in FIG. 5, the labels can be printed on a preset label template and/or a predefined card layout including a QSL artwork or photo. The system also provides the user the ability to print a Text Report detailing any or all the QSL communication between a specific Recipient or Station.

Figure 7:
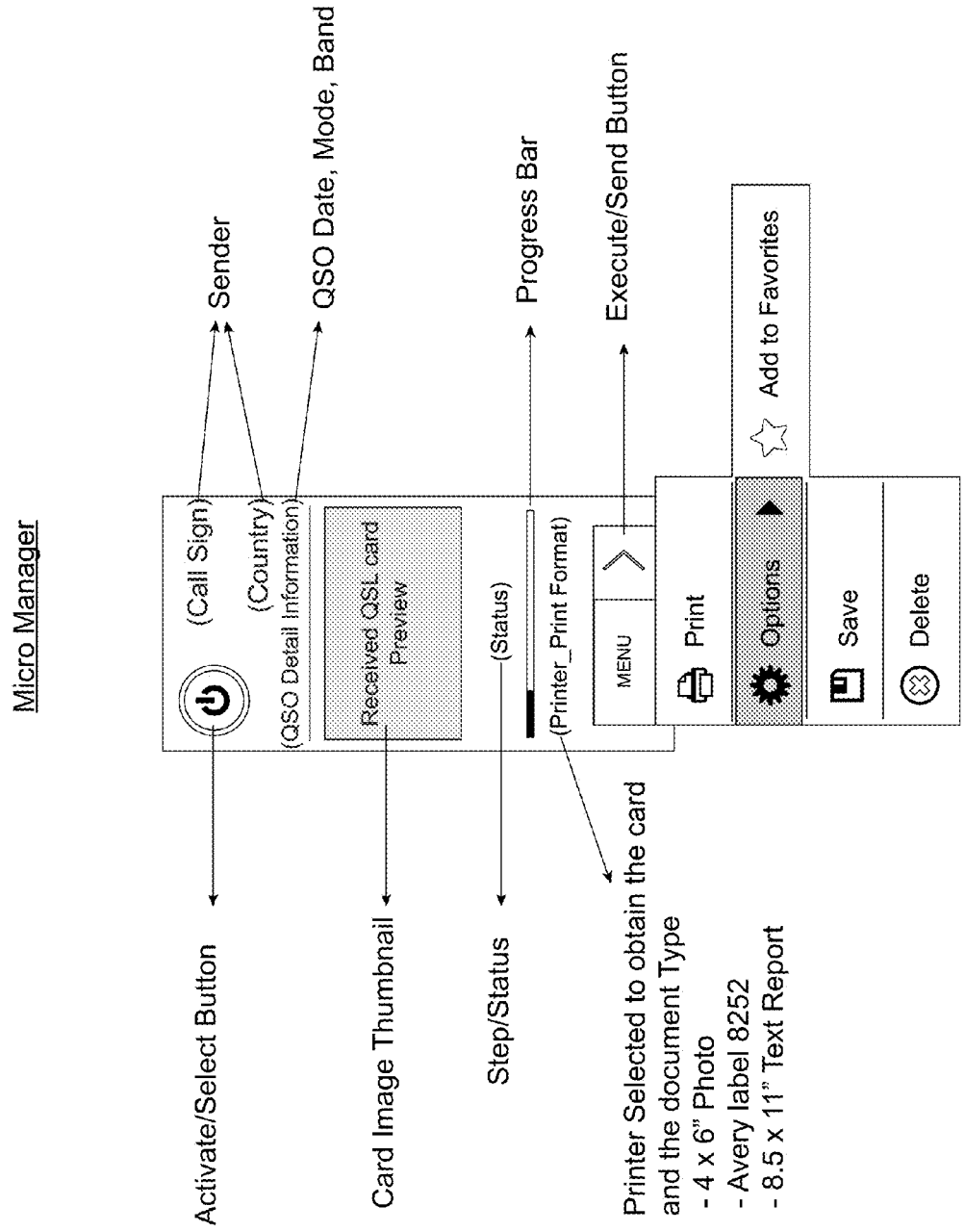
FIG. 7 illustrates a Micro Manager window of the system according to the present invention.
Figure 8:
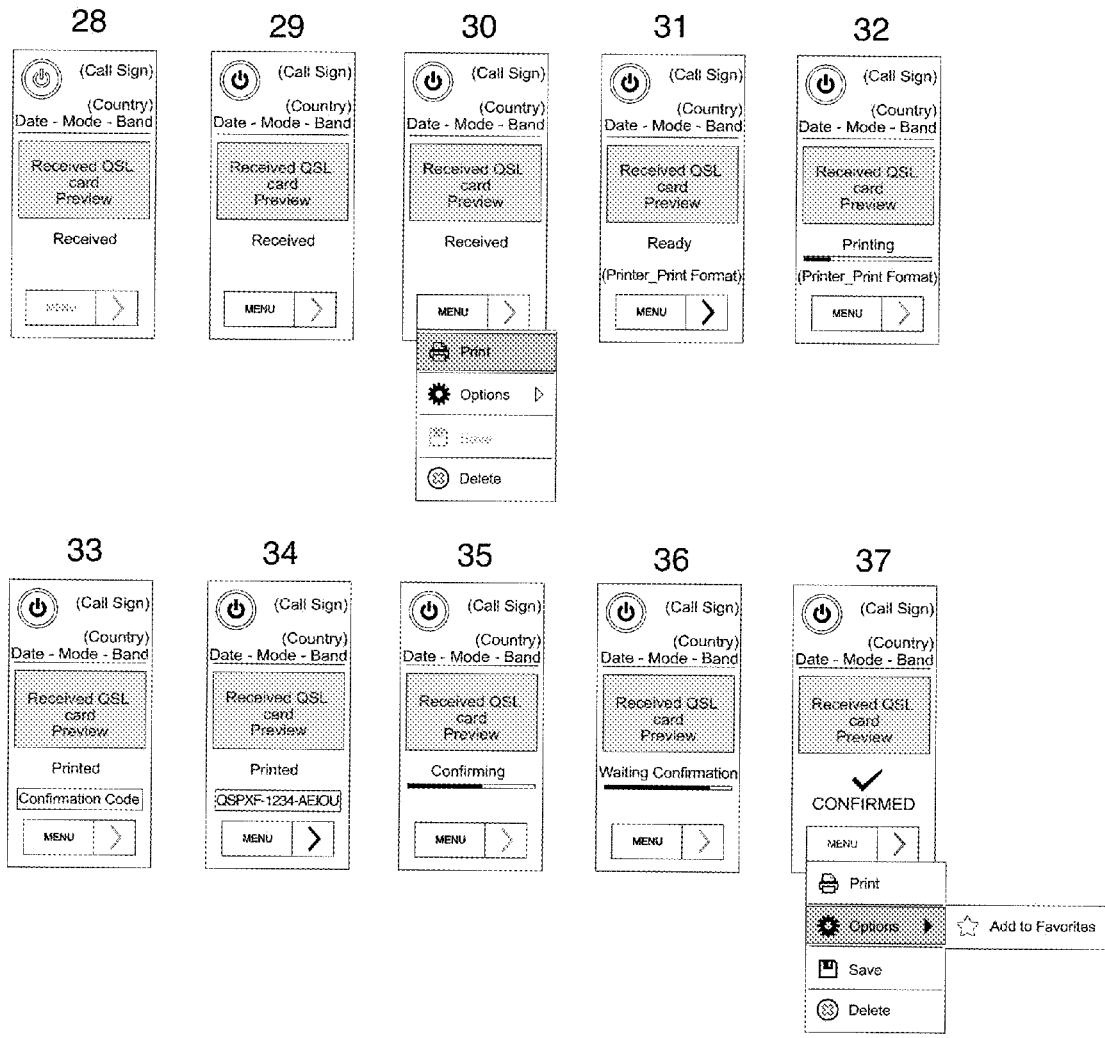
FIG. 8 illustrates the QSL management process of the system according to the present invention.

The Micro Manager feature of the invention will be explained in conjunction with FIGS. 7 and 8. The Micro Manager GUI shows an Activate/Select button along with a visual identification of the sender's Call Sign, Country and QSO detail information such as: QSO date, Mode and Band. A Card thumbnail is available and visible to the user via a Preview window. The GUI also provides visual indication of the step or status of the Confirmation process such as a progress bar. A MENU is provided to the user for performing several related actions such as Print, Add to Favorites, Save and Delete. Once a user access the Micro Manager area the first step is to select/activate the Micro Manager. Once selected, the MENU is available. In order to obtain the QSL card and start the Confirmation process the user must print the card. If the user is not interested in the card, the user could simply delete it via the appropriate option in the MENU. If desired, the card is set and ready to print. The execute/send button is active as indicated by a bright green color. The Micro Manager will show the "Printing" status while the printing process is complete. Once the Card is printed and the "Printed" status is visible the Confirmation Code must be submitted in order to confirm the QSL process. Once the code is enter the execute/send button turns active and the "Confirming" status is visible while the system accepts the code. If the other station does not submit the code the Micro Manager will show the "Waiting Confirmation" status until the other station submits the code along with its pin number. When both stations submit the Confirmation Code the "Confirmed" status is granted and the "Save" and "Add to Favorites" options on the MENU are available.

The system, its web interface and GUI will be explained in conjunction with FIGS. 9-25*a*.

Figure 9:
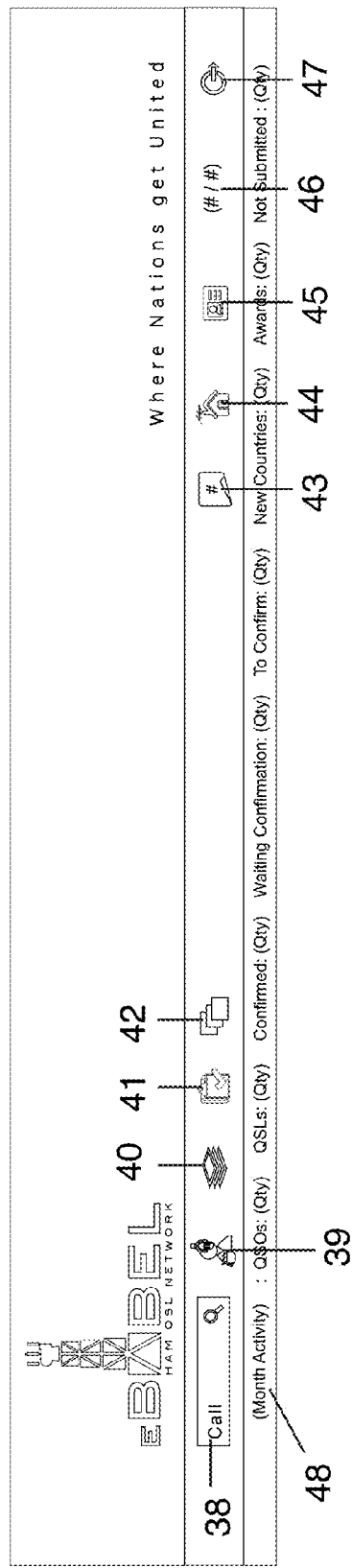
FIG. 9 illustrates a top menu of the Graphical User Interface (GUI) of the system according to the present invention.

FIG. 9 illustrates a User Homepage and Manager Section Main Menu Layout. The page provides information such as but not limited to: the Membership Plan Status 46 and the QSO/QSL Monthly Activity 48. Several Link buttons and/or Controls are also provided. A Call Sing Lookup Tool 38 is provided to allow a Call Sign search for identifying particular users. The results of the search are shown on a separate window on the system, the ShackWall. A User Wall or Shack-Wall button 39 is provided to direct the user to his/her personal wall. Desktop 40 and Manager buttons 41 are also provided to the user as well as the persona ShackWall Section setting page button 42 allowing the user access to his/her personal page for setting purposes. The system provides an internal messaging system so that a Sticky Note Message button 43 indicating the number of unread or new messages received is shown to the user. This button also opens the CQBoard messenger unit in a separate floating window. User Homepage and User Account Setting Page buttons 44 and 45, respectively, are also provided. Finally, a Logout button 47 is provided to complete logout of the system.

Figure 11:
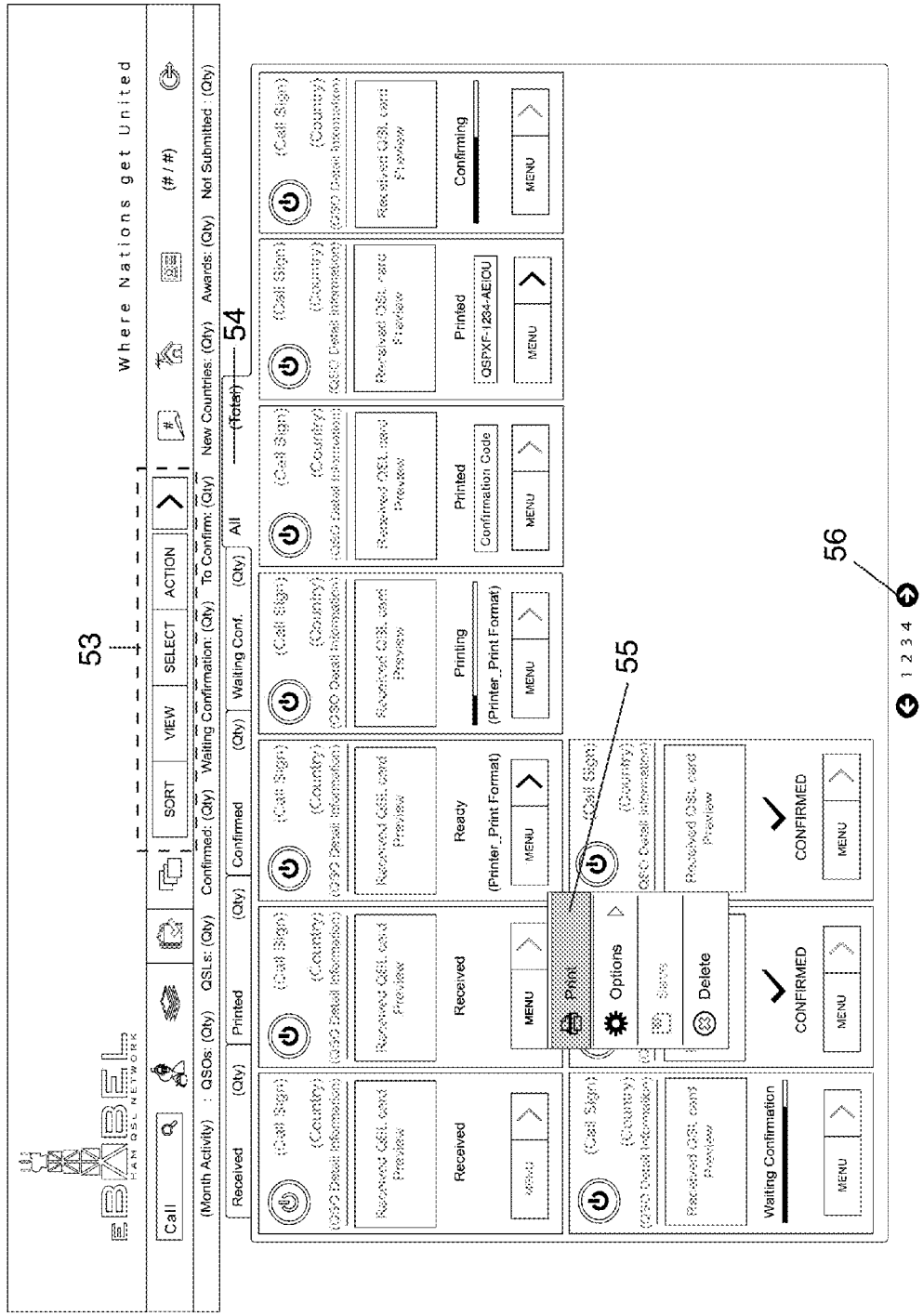
FIG. 11 illustrates Manager Section screen layout of the Graphical User Interface (GUI) of the system according to the present invention.
Figure 11A:
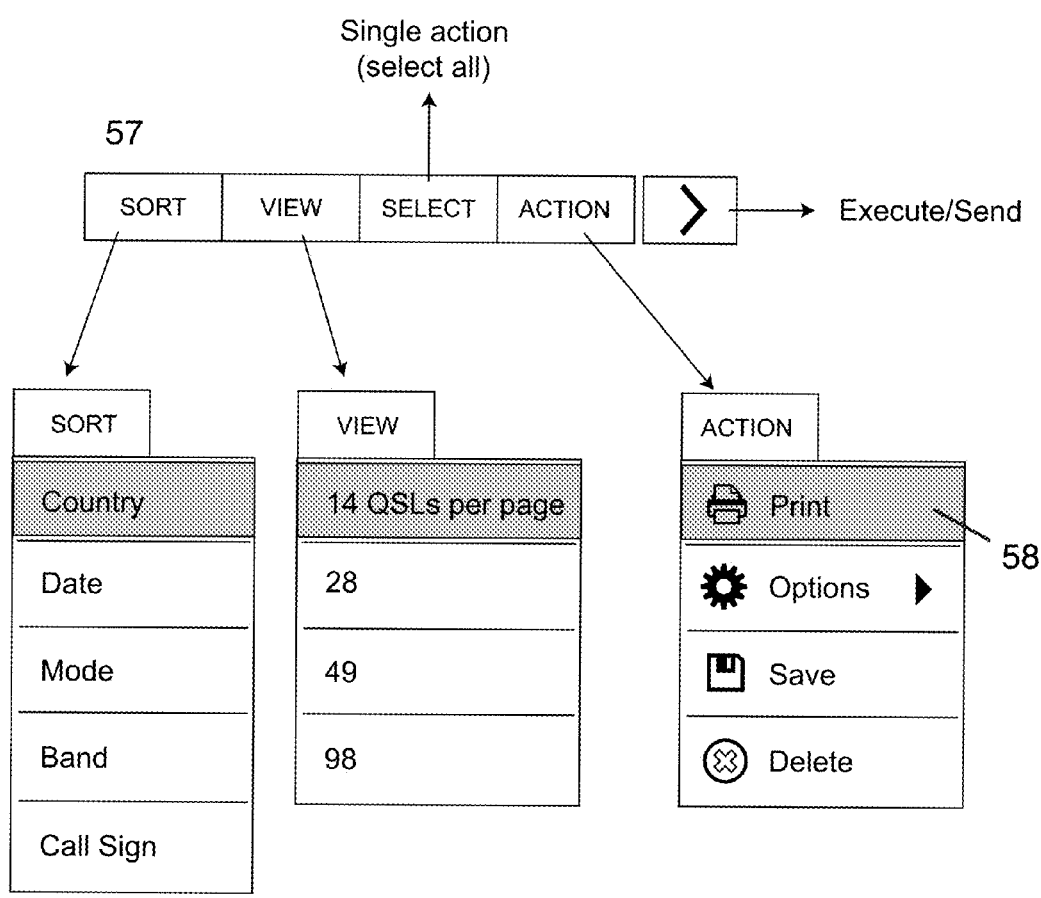
FIG. 11a illustrates Submenu options of a top menu portion of the Graphical User Interface (GUI) of the system according to the present invention.
Figure 12:
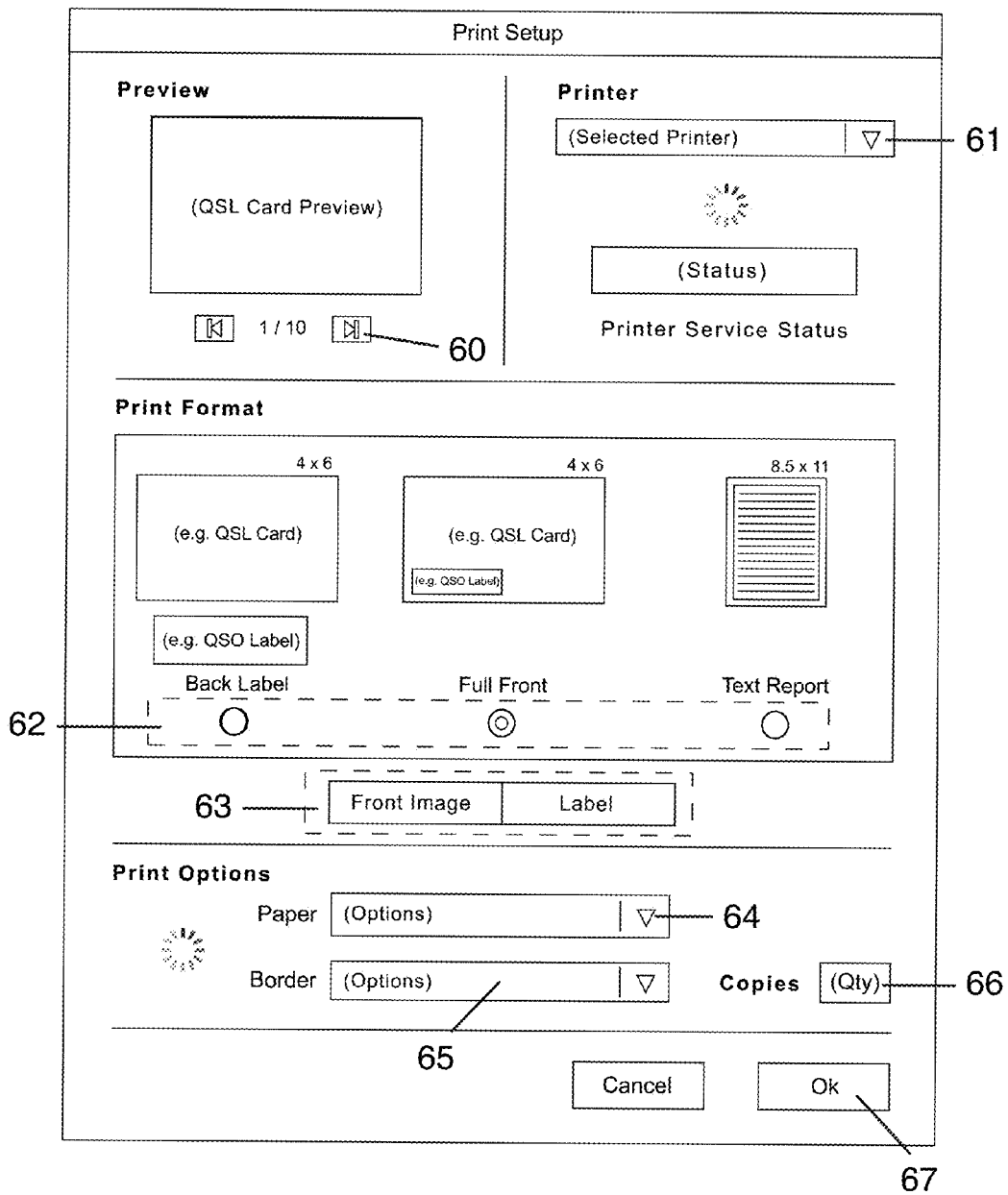
FIG. 12 illustrates the Print Setup window of the Graphical User Interface (GUI) of the system according to the present invention.

FIG. 10 illustrates a User Homepage Section that will provide the user the flexibility to setup a personal home page preferably 51 using Widgets 50 that will display any website section selected by the user. The user will have control of the content shown on this page. A calendar button 49 containing the reminders set by the user is provided. As can be seen, a home button 52 is also provided, FIGS. 11, 11*a* and 12 illustrate the Manager Section layout according to the invention. A general Menu 53, 57 is provided to manage several Micro Managers at a time and to control the selected tab. The general Menu has: 1) Sort tab for sorting the Micro Managers by: Country, Date, Mode, Band or Call Sign, 2) View tab for selecting the amount of QSL's to be shown per page, 3) Select tab to allow the user to select all the Managers available, 4) Action tab allowing the user to Print, Add to Favorites, Save or Delete any Micro Manager. Section tabs 54 are also provided on the window where the QSL's will be organized by their status (i.e., Received, Printed, Confirmed, Waiting Confirmation, Confirmed and All). A navigation menu 56 is also provided to allow navigation across the window content. When the "Print" command 55, 58 is selected the "Print Setup" window appears as illustrated in FIG. 12. Navigation buttons 60 are provided on the "Print Setup" window to allow to user to move through the several card previews. A drop down menu 61 is also provided to select a specific printer to use. A Selection control 62 is provided to select the type of print job (i.e., back label, full front to Text Report). In addition, print type selection buttons 63 are provided to select between a front image (artwork) and a label in case the back label format was selected by the user to print the card. The user can also select the different paper options 64, 65 available for each print format (e.g. 4×6 photo glossy or lustre, Avery™ 8252 and 8.5×11 plain paper, etc.). Finally, the window allows the user to select 66 how many copies are going to be printed and to save all the settings. An Ok button 67 is also provided to close the window.

Figure 13:
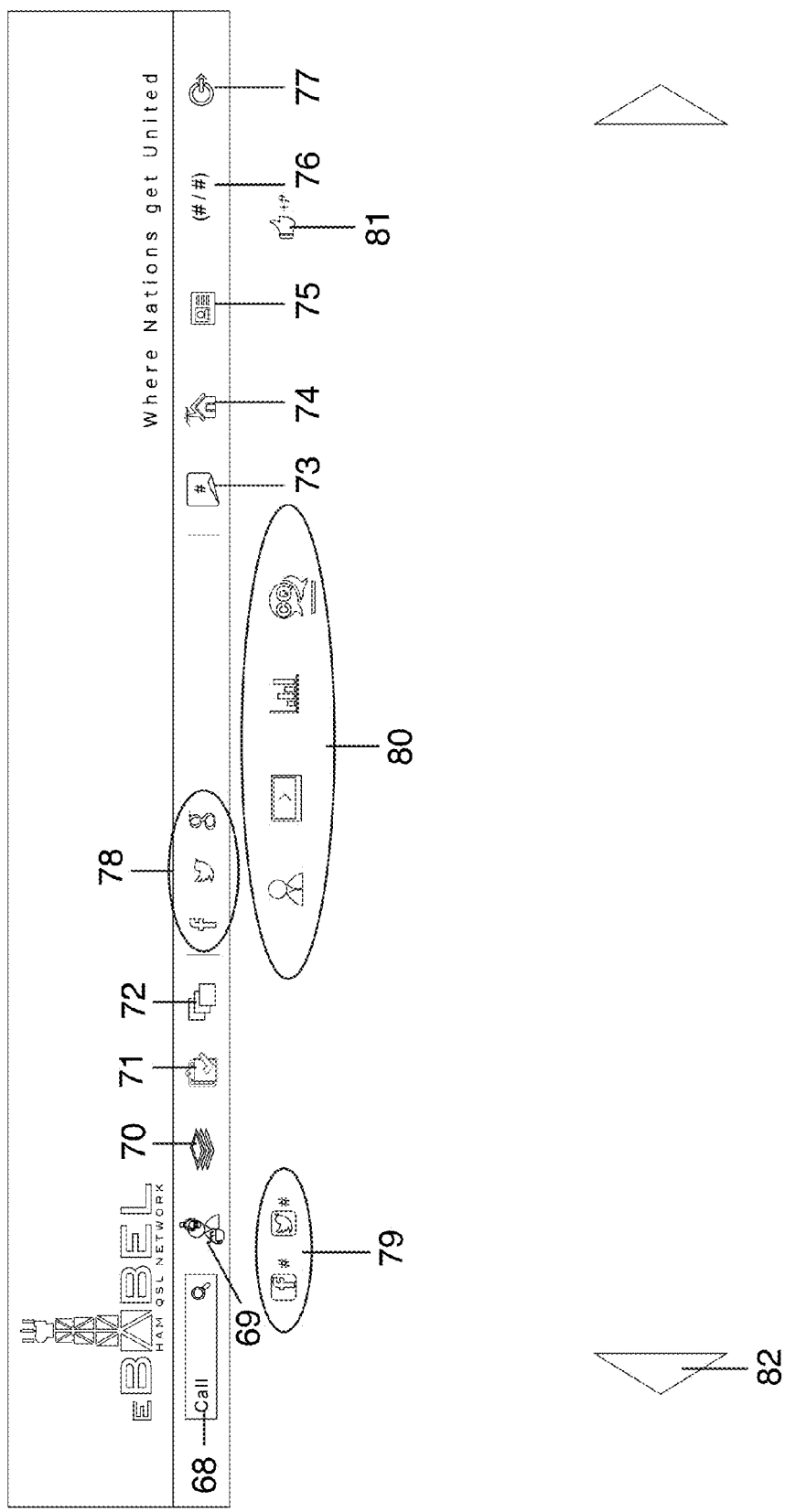
FIG. 13 illustrates the menu options of the ShackWall window of the Graphical User Interface (GUI) of the system according to the present invention.

FIG. 13 illustrates the ShackWall Section Main Menu layout. As previously explained a Call Sign Lookup Tool 68 is provided to allow a Call Sign search for identifying particular users. A User Wall or ShackWall button 69 is provided to direct the user to his/her personal wall. Desktop 70 and Manager buttons 71 are also provided to the user as well as the persona ShackWall Section setting page button 72 allowing the user access to his/her personal page for setting purposes. The system provides an internal messaging system so that a Sticky Note Message button 73 indicating the number of unread or new messages received is shown to the user. This button also opens the CQBoard messenger unit in a separate floating window. User Homepage and User Account Setting Page buttons 74 and 75, respectively, are also provided. A Membership Plan Status 76 is also provided. A user's social media accounts are indicated at 78 and social media tools are also provided at 79 to allow access and/or control of the same. This page also provides ShackWall sections buttons 80 providing the user access to the Profile, Display, Operation Trend and CQBoard sections. A "Likes" button 81 is also provided. Arrows controls 82 are provided to move across the sections. Finally, a Logout button 77 is provided to complete logout of the system.

Figure 14:
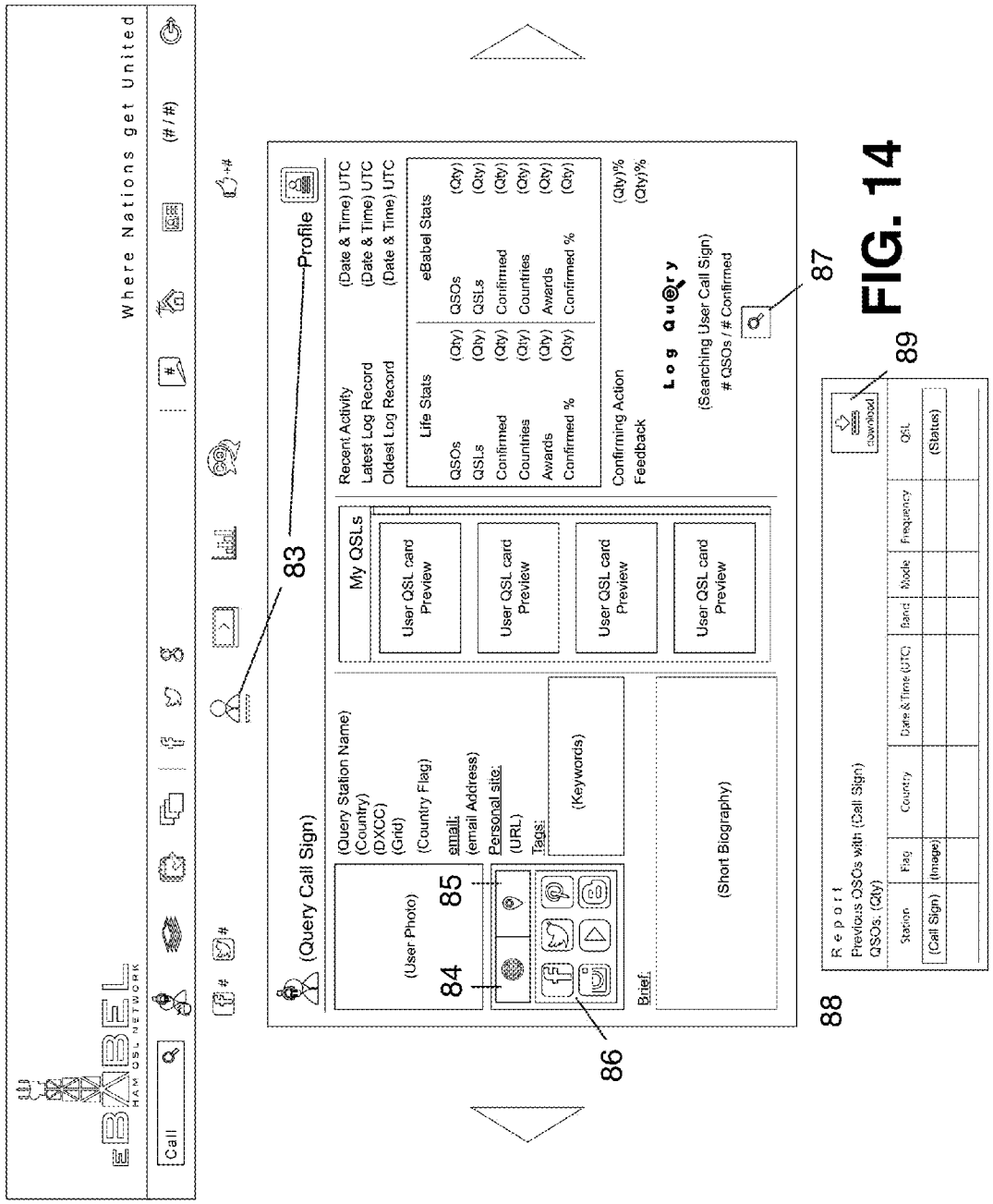
FIG. 14 illustrates ShackWall Profile Section layout window of the Graphical User Interface (GUI) of the system according to the present invention.

FIG. 14 illustrates the ShackWall Profile Section layout. The profile section 83 shows concentrate and concise information about the query station such as Amateur Radio operator public information, personal info and eBabel Statistics. The user will set this content on the ShackWall setup section. A QRZ.com link button 84 is provided that will open a browser tab containing the user's page at qrz.com. In addition, a Google Map link button 85 is provided that will open a browser tab containing the user position. Section 86 shows the Social Media links set by the user. A report button 87 is provided to show a report 88 of previous contacts between the actual user and the query station. Finally, a download button 89 allows to download the table content of the repot in ADIF or PDF format.

Figure 15:
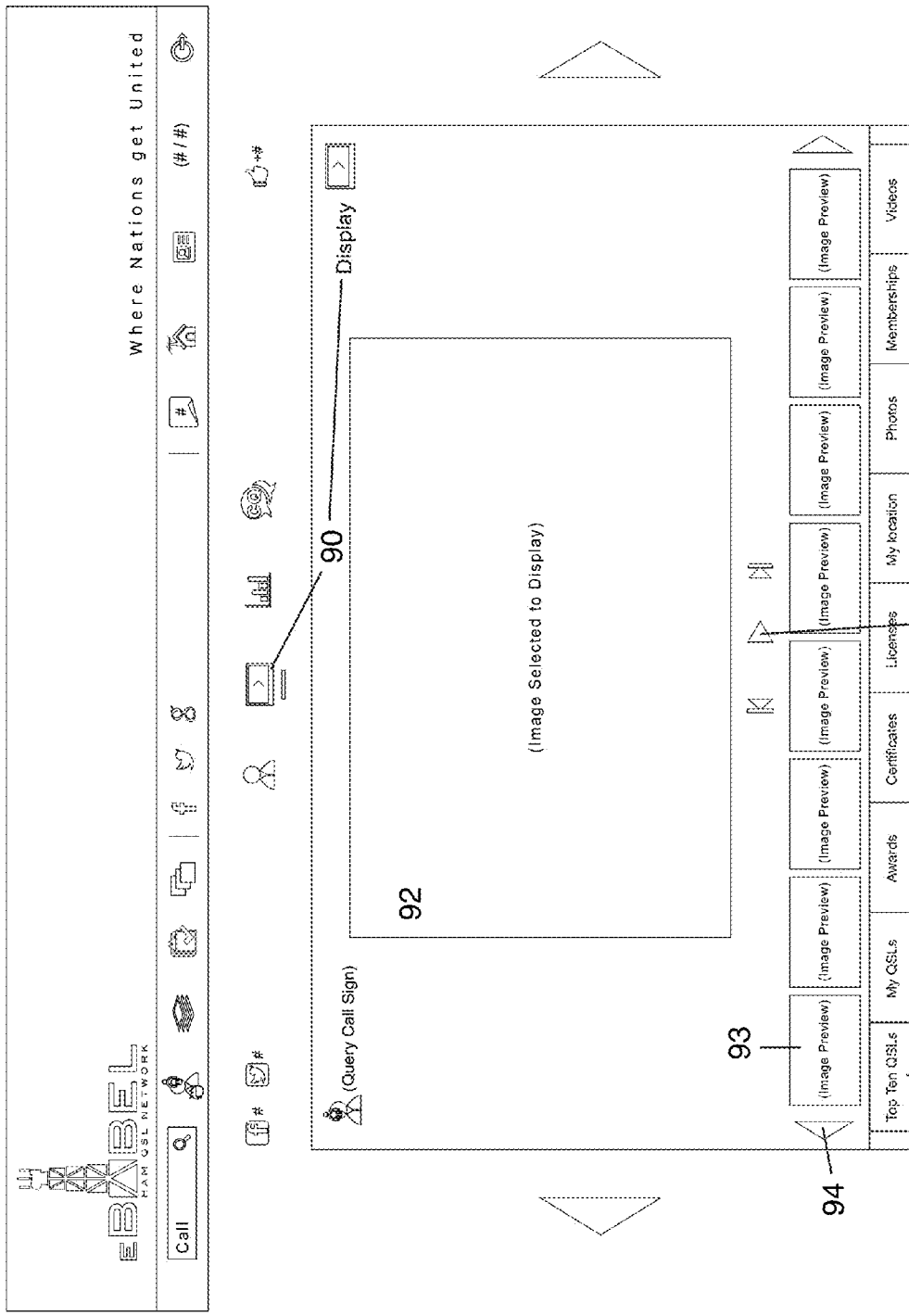
FIG. 15 illustrates ShackWall Display Section layout window of the Graphical User Interface (GUI) of the system according to the present invention.

FIG. 15 illustrates ShackWall Display Section layout. The Display section 90 shows all the image archives set by the user on the ShackWall setup section. Display controls 91 are provided to control the navigation view of the images. An image preview (thumbnail) section 93 is provided to select the image to be displayed. Navigation arrows 94 are provided to move across the thumbnails. A Folders Categories section 95 is also provided to organize the user's information.

Figure 16:
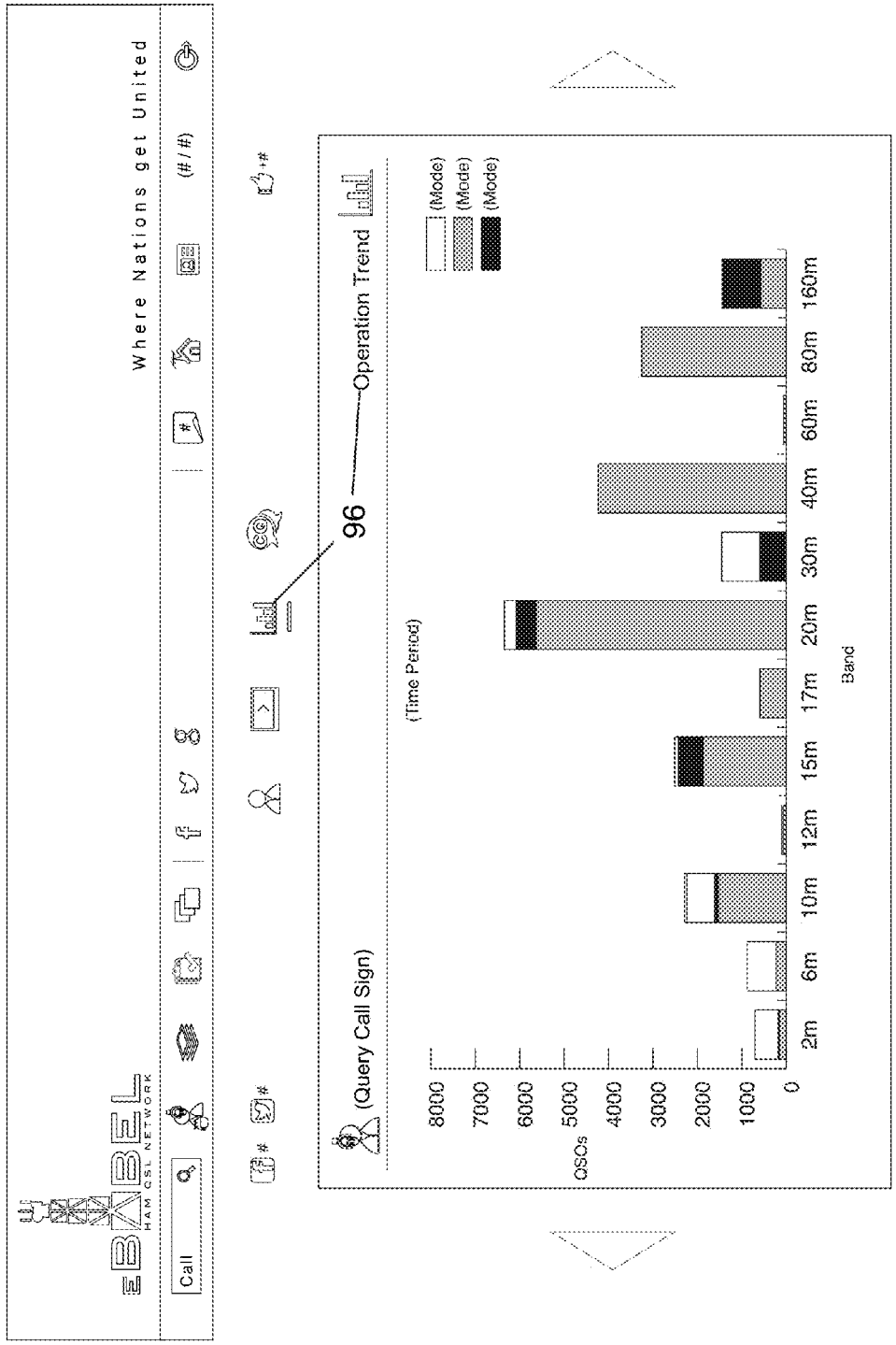
FIG. 16 illustrates ShackWall Operation Trend Section layout window of the Graphical User Interface (GUI) of the system according to the present invention.

FIG. 16 illustrates the ShackWall Operation Trend Section Layout. In this page an operation trend section 96 shows how the system takes the QSO records from the user archives and makes a chart of the QSOs vs Band and Mode. The confirmation status will not be considered, only the QSOs in the uploaded logbook.

Figure 17:
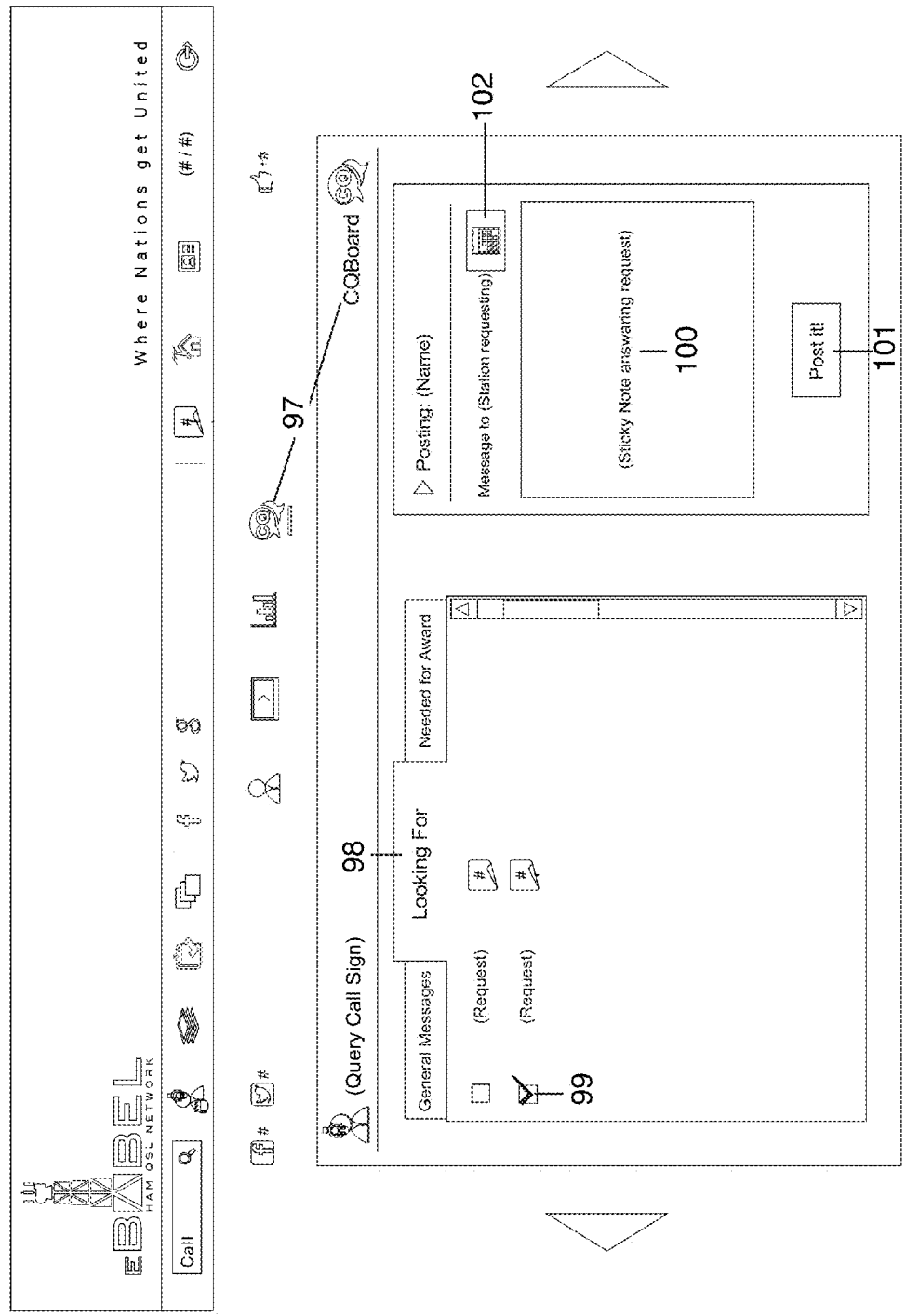
FIG. 17 illustrates ShackWall CQBoard Section layout window of the Graphical User Interface (GUI) of the system according to the present invention.
Figure 17A:
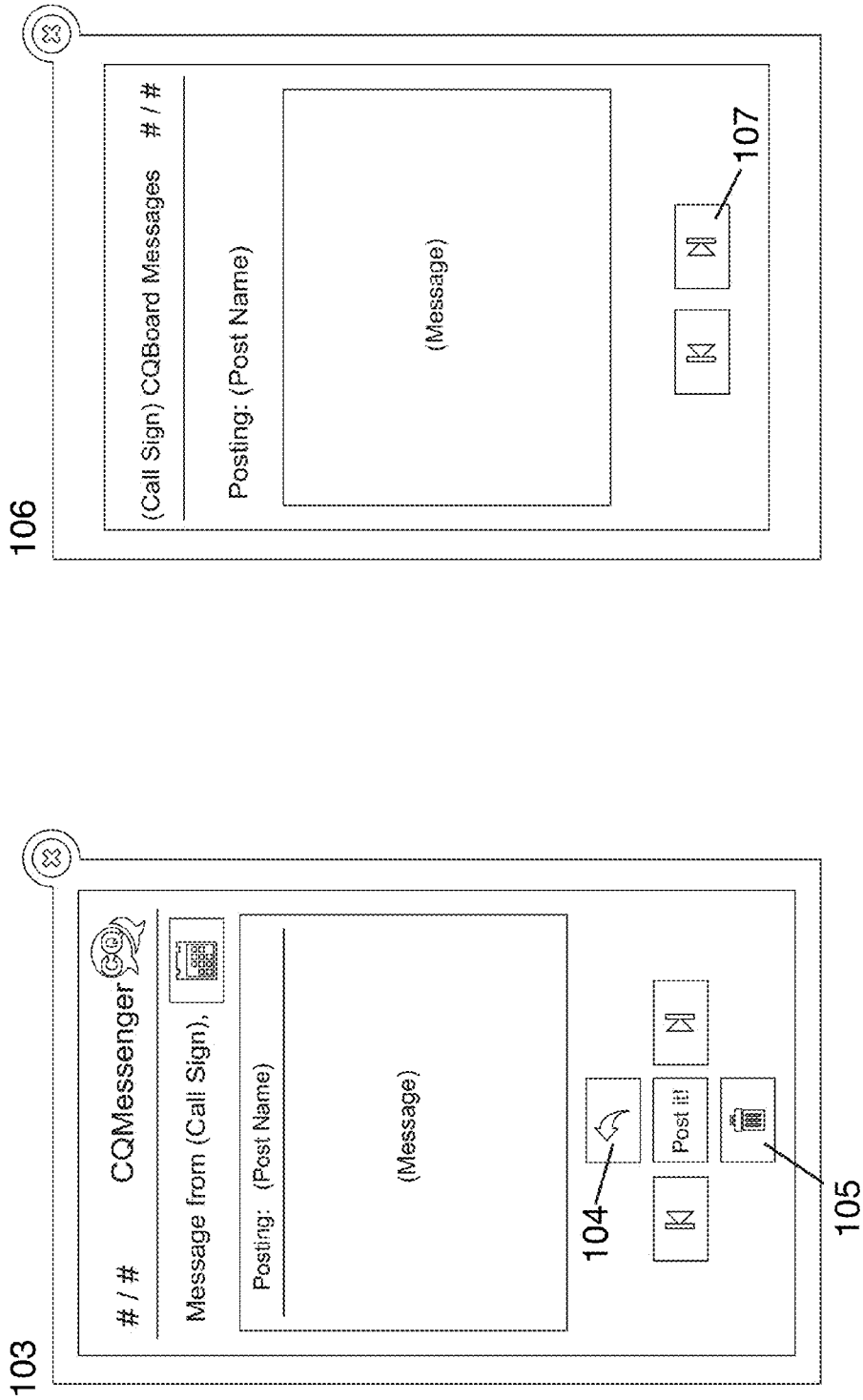
FIG. 17a illustrates the messages and notes window of the Graphical User Interface (GUI) of the system according to the present invention.

FIGS. 17 and 17a illustrate the ShackWall CQBoard Section Layout. The CQBoard section 97 is a bulletin board where the user can request any desire QSO. (e.g. a Country, a grid an Island etc.). The purpose of this board is to make possible the interaction between stations and fulfill any desire QSO in particular. These postings will be set at the ShackWall setting section. If the user visiting the CQBoard section of a user wants to answer a request they must leave a message (sticky note) to arrange any kind of appointment or interaction. Also the system will look for matching needs. For example a station in USA needs a QSO with Japan and the Japan station also needs USA, the system will send a message to the stations to start any interaction possible between them. All messages generated or posted in this bulletin board will be public. Anyone could see any message. The CQBoard tab section has a "General Messages" tab, a "Looking For" tab and a "Needed for Award" tab, wherein all three sections have the same format. A check box 99 is provided to select the desire post to be answer. Automatically a sticky note sheet will be available to write a note with a maximum of 160 characters. By touching the sticky note sheet 100 the cursor appears to start writing. A "Post It!" button 101 is provided to allow the user to post the message in the board. The sticky note 106 besides the posting will show the number of answers related to that post. To see all of them, the user must tab on the icon and a floating message board will appears. Navigation arrows 107 allow navigation across the messages. An actual user message received indicator 103 is provided and when clicked the CQMessenger floating unit appears. A Reply Message and a Delete Message button are also provided. A button 102 is provided to set the message on display to the reminder calendar section.

Figure 18:
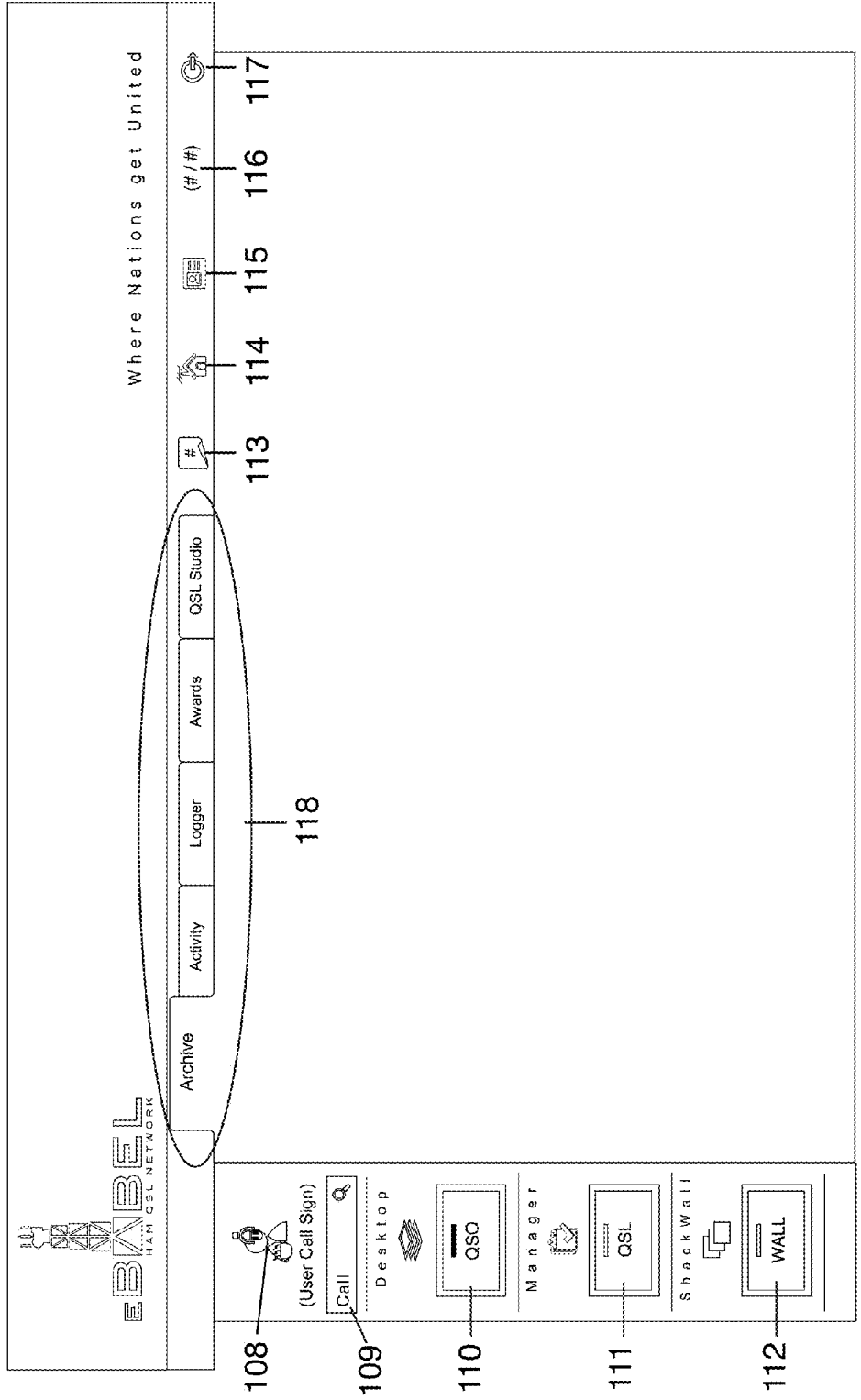
FIG. 18 illustrates the Desktop Section Main Menu layout window of the Graphical User Interface (GUI) of the system according to the present invention.

FIG. 18 illustrates the Desktop Section Main Menu Layout. A User Wall (ShackWall) button 108 is provided as well as a Call Sign Lookup Tool button 109 that leads to the query station wall (ShackWall). Desktop 110 and Manager buttons 111 are also provided to the user as well as the persona ShackWall Section setting page button 112 allowing the user access to his/her personal page for setting purposes. A Sticky Note Message button 113 indicates the number of unread or new messages received. This button also opens the CQBoard messenger unit in a separate floating window. User Homepage and User Account Setting Page buttons 114 and 115, respectively, are also provided. A Membership Plan Status 76 is also provided. A Membership Plan Status 116 is also provided. Desktop Section tabs 118 are provided to give the user access to the information stored in the Archive, Activity, Logger, Awards, QSL Studio sections. Finally, a Logout button 117 is provided to complete logout of the system.

Figure 19:
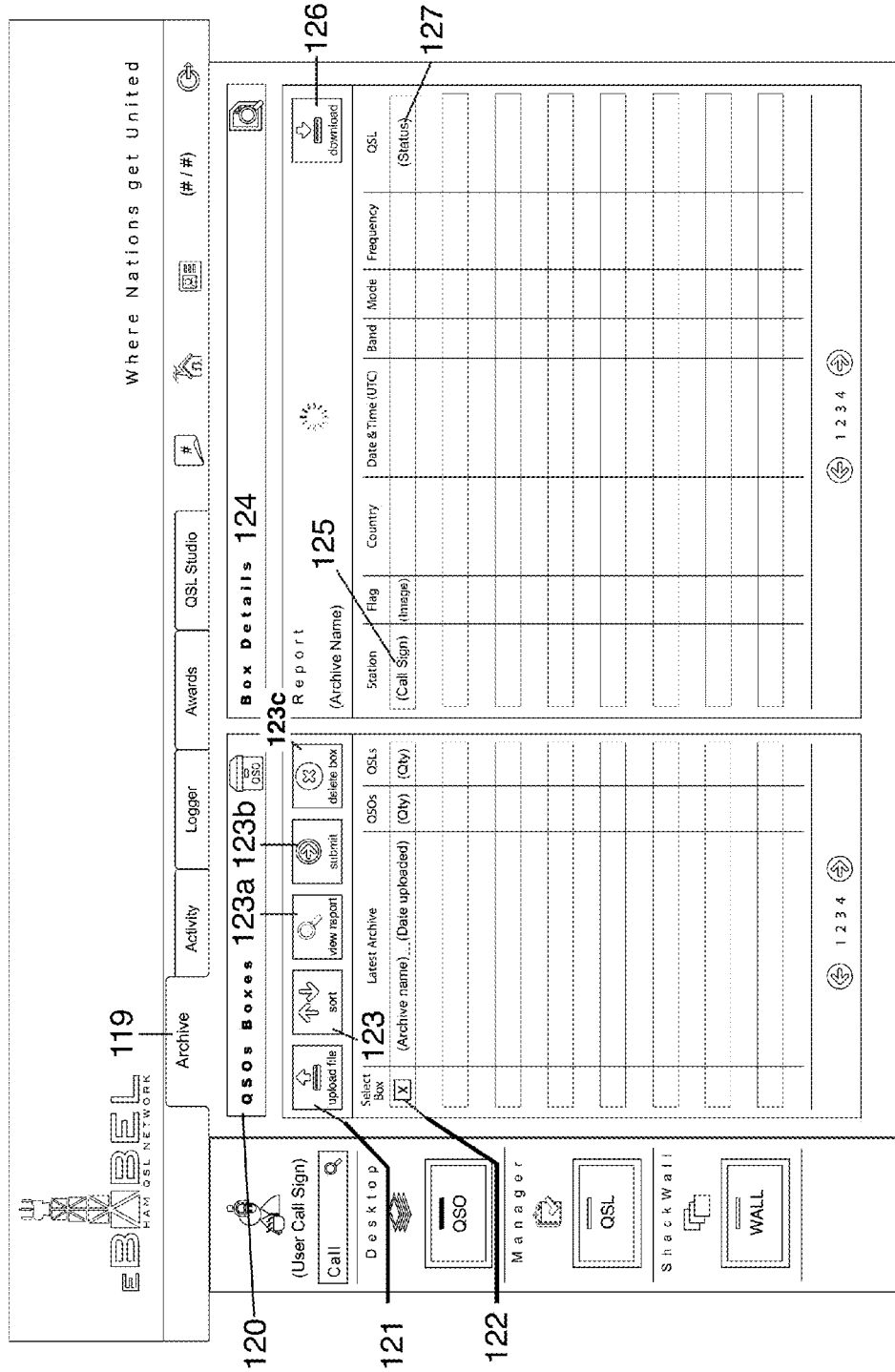
FIG. 19 illustrates the Desktop Section Archive Tab layout window of the Graphical User Interface (GUI) of the system according to the present invention.

FIGS. 19 and 19a illustrate the Desktop Section Archive Tab Layout. An archive selection tab 119 is provided to allow access to archived-related information 120. Specifically, the archive section will storage and manage the user ADIF files. The "QSO Boxes" sub-window section will list all the files in boxes containing a maximum of 200 QSOs. Also will show the quantity of QSOs and QSLs inside of it. The "Box Detail" sub-window section 124 is a report that shows the detail of the box selected. Including the QSO information and the QSL status. A button 121 is provided to upload the ADIF files to the eBabel System Server. Check Box 122 is provided to select the archive to manage and button 123 is provided to sort the files by name or date. A View Report 123a is provided to allow opening the "Box Details" sub-window section to see the box content. A button 123b is provided to submit the selected Box to the database to look for matching records. A Delete button 123c is provided to delete the selected Box. A button 125 will open a floating window 128 with the Profile of the call sign selected. A button 127 will open a floating window 129 with the Micro Manager of the QSL selected. A download button 126 is provided to download the report in ADIF or PDF format.

Figure 20:
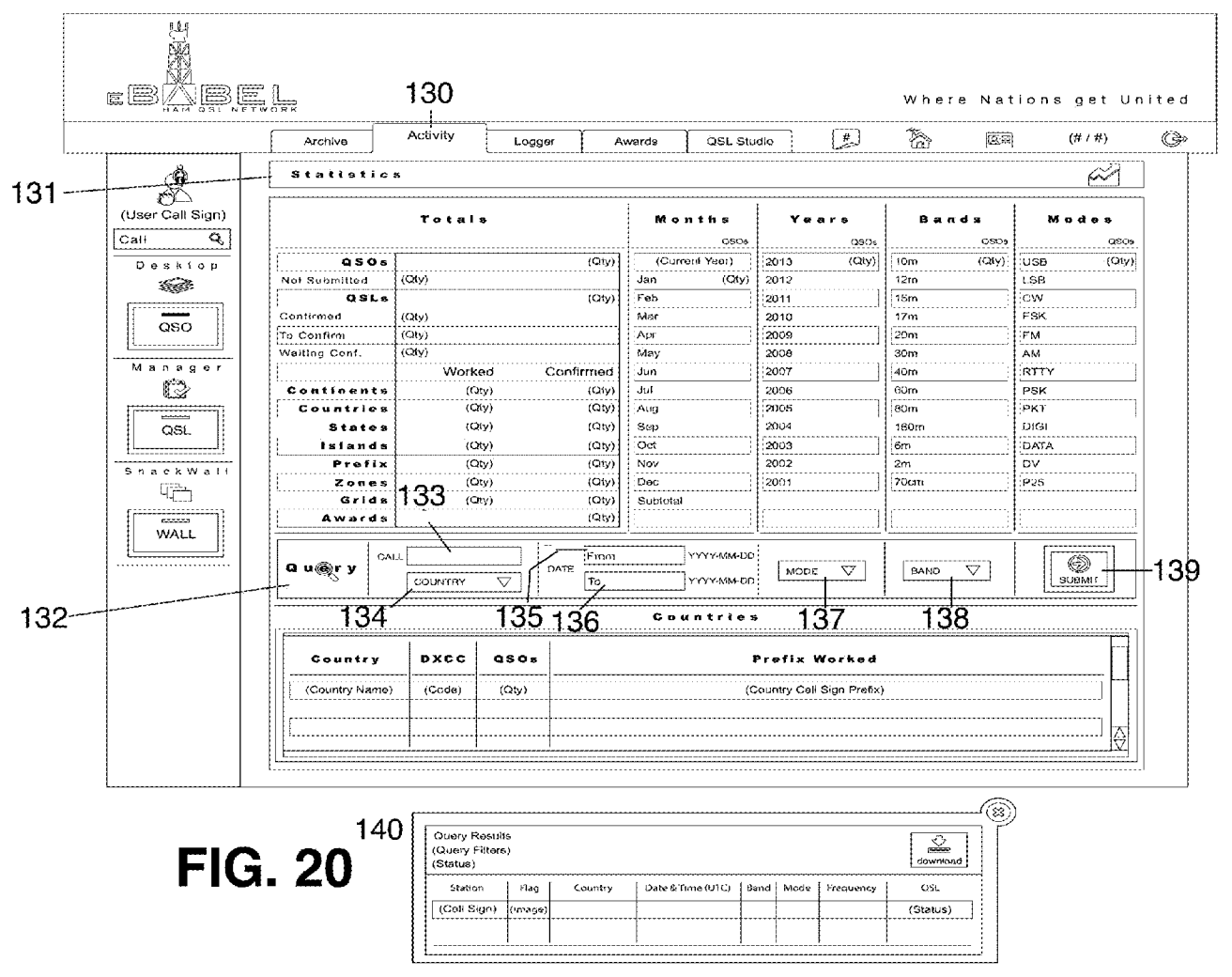

FIG. 20 illustrates the Desktop Section Activity Tab Layout. Activity selection tab 131 is provided to show activity information 131 and the break apart of the QSO archive into its different components. The QSO information will be tabulated into different fields like a spreadsheet. A Query tool 132 is provided that will search only on the user's QSO records. The user could use the different filters to look faster among the archive such as: Call Sign filter 133, Country filter 134, Start date filter 135 and End date filter 136, Mode filter 137 and Band filter 138. A submit button 139 is provided to generate a report 140.

Figure 21:
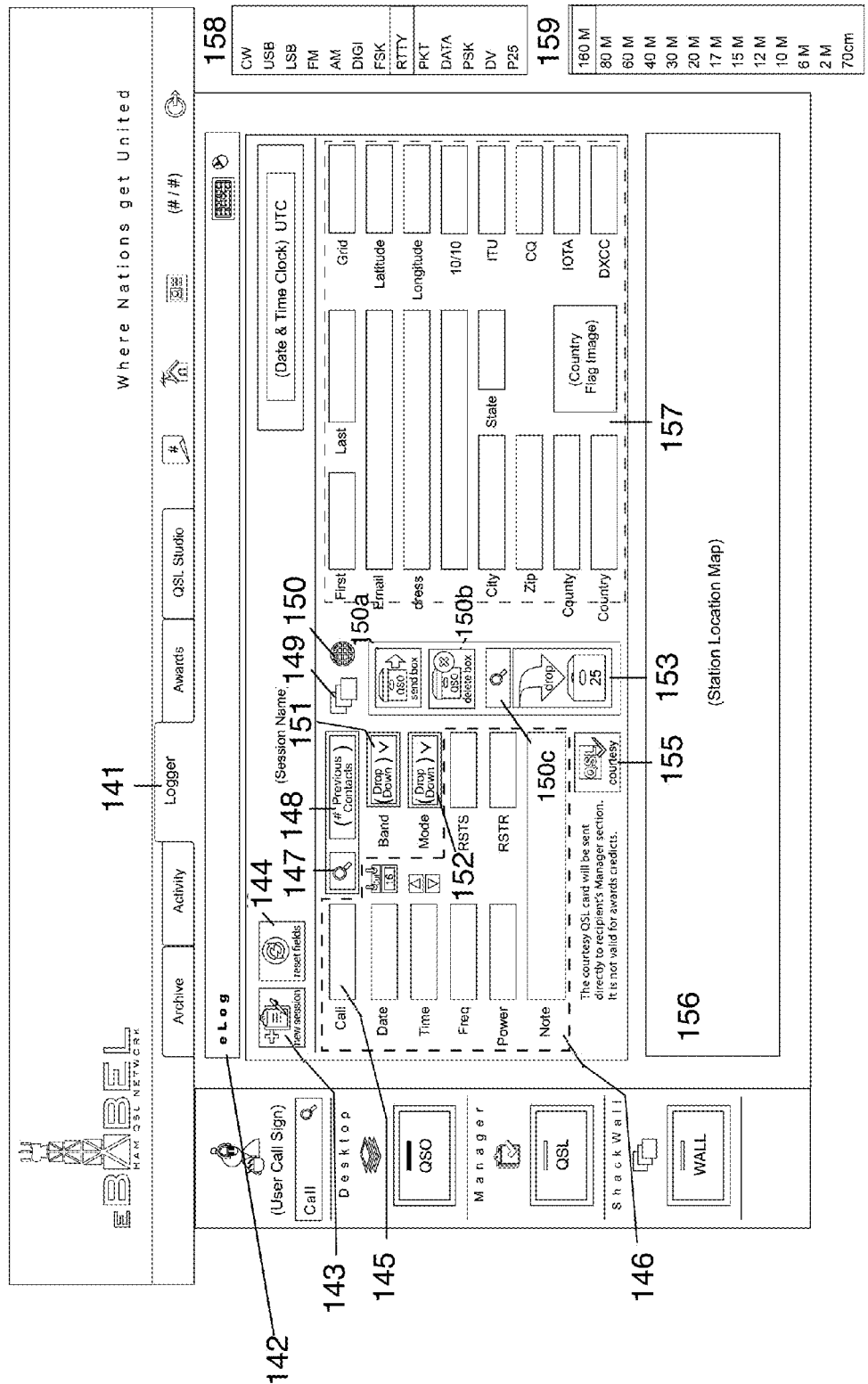
FIG. 21 illustrates the Desktop Section Logger Tab layout window of the Graphical User Interface (GUI) of the system according to the present invention.
Figure 21A:
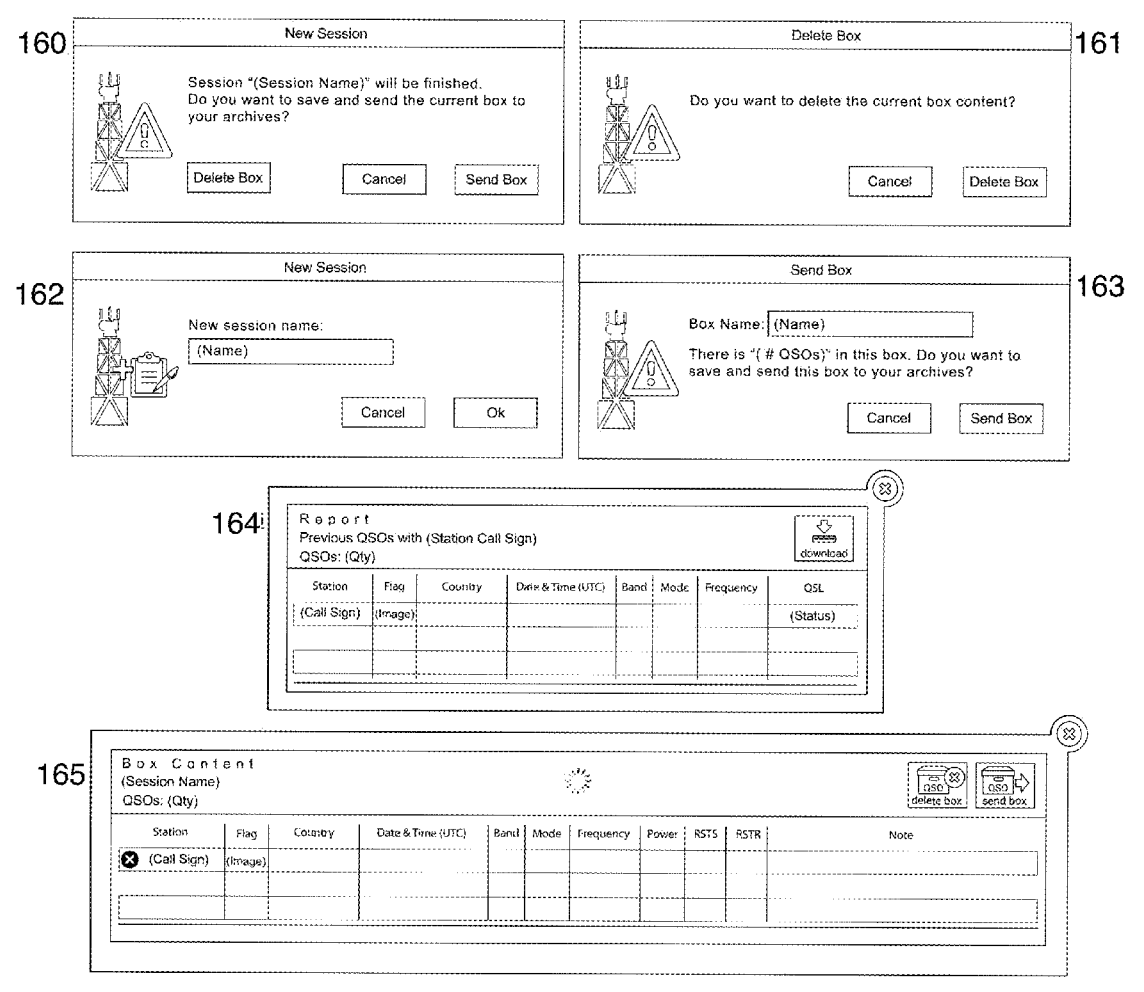

FIGS. 21 and 21a illustrate the Desktop Section Logger Tab Layout. A Logger selection tab 141 provides access to a tool 142 for performing manual QSO entries. Once the user makes a station query the location will be displayed on Google map in section 156. A button 143 is provided to start a new session that will open a floating window 160 and a new name is entered at another floating window 162. Writing the call sign in the Call area 145 is the first step when login a QSO. This section provides the QSO details fields 146. A Lookup button 147 is provided so that once the user writes the call sign and selects this button the information of the station is automatically displayed in section 157. A Previous contacts information area 148 is also provided that will show a floating window 164. Band selection dropdown 151 to select a band 159 and Mode selection dropdown 152 to select a mode 158 are also provided. A ShackWall section button 149 will open a browser tap with the Wall page of the station and a QRZ.com button 150 will open a browser tap with the qrz.com page of the station. A button 150a is provided to send the box to the user Archive section where will be displayed on the "QSO Boxes" list and a floating window 163 is shown to enter a name. A button 150c is provided to show the box content in floating window 165. Button 153 is provided to drop the QSO entry into the box. When the user ends, each QSO entry must list it in a local file or box before submitting it to the database. This box could represent a session or a fraction of one. It will hold a maximum of 200 QSO number per box. A Delete button 150c is provided to delete the box and a floating window 161 is shown to confirm deletion. A button 155 is provided to send a Courtesy QSL card. If the user wants to confirm a QSO but doesn't need it for awards credits the user could send a Courtesy QSL. This card will go directly to the recipient's manager account and won't go to the database for matching purposes. Finally, a Reset button 144 is provided to reset all the logger fields.

Figure 22:
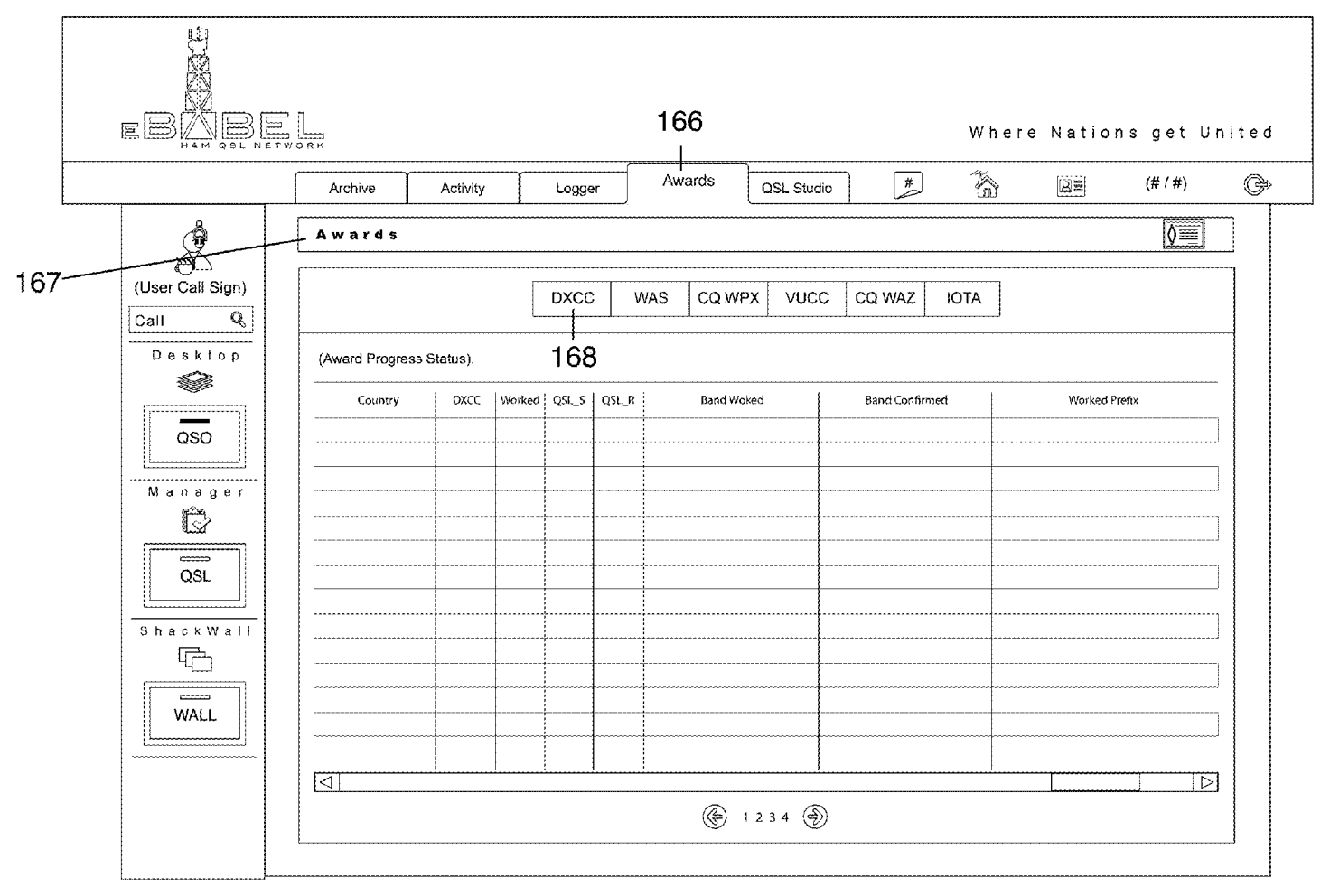

FIG. 22 illustrates the Desktop Section Awards Tab Layout. An Awards selection tab 166 is provided to allow access to an Awards tracking section 167. Buttons 168 are provided to select the desired award to monitor.

Figure 23:
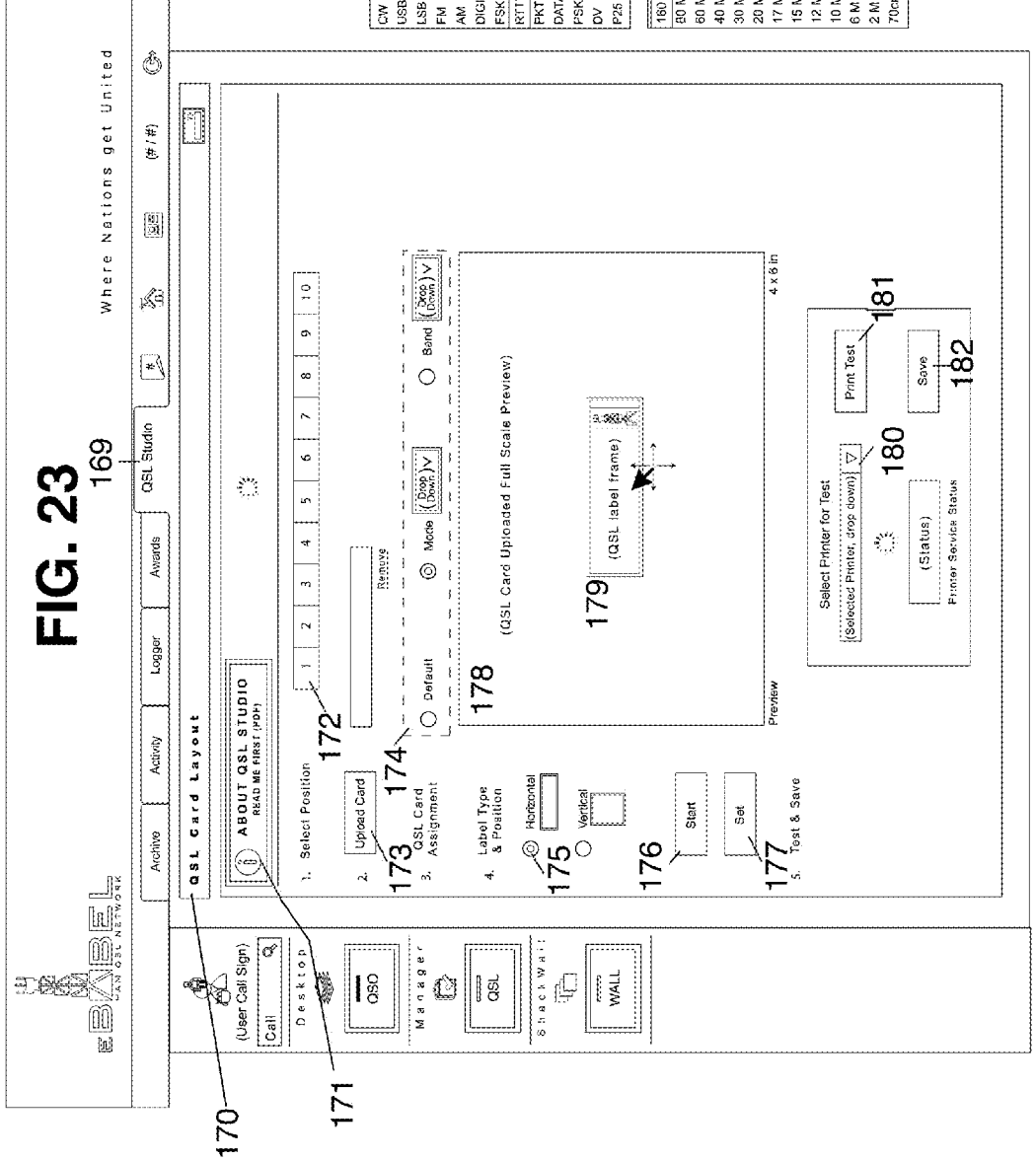
FIG. 23 illustrates the Desktop Section QSL Studio Tab layout window of the Graphical User Interface (GUI) of the system according to the present invention.

FIG. 23 illustrates the Desktop Section QSL Studio Tab Layout. A QSL Studio selection tab 169 is provided to allow access to a tool 170 for uploading and setting the user QSL(s). An area 171 provided access to the Instruction manual in PDF format. An area 172 is provided to set the position of the card to be upload. The user could upload various QSL cards. an Upload button 173 is provided to upload the card to the server. Once the card is in the system a full size preview will be display in area 178. A QSL card assignment radio button 174 is provided so that the card could be used in a specific QSO category 183, 184 (e.g. mode, band or a combination of both). Another radio button 175 is provided to choose the label type. A Start button 176 is provided to start the process of label positioning. The label fame 179 will be display over the card preview 178 and the user will grab and move it to decide the final placement. A set button 177 is provided to set and save the final label position. A dropdown menu 180 is provided to select the printer to perform a test and a button 181 is provided to send the card to the printer. A Save button 182 is provided to save and finish the process.

Figure 24:
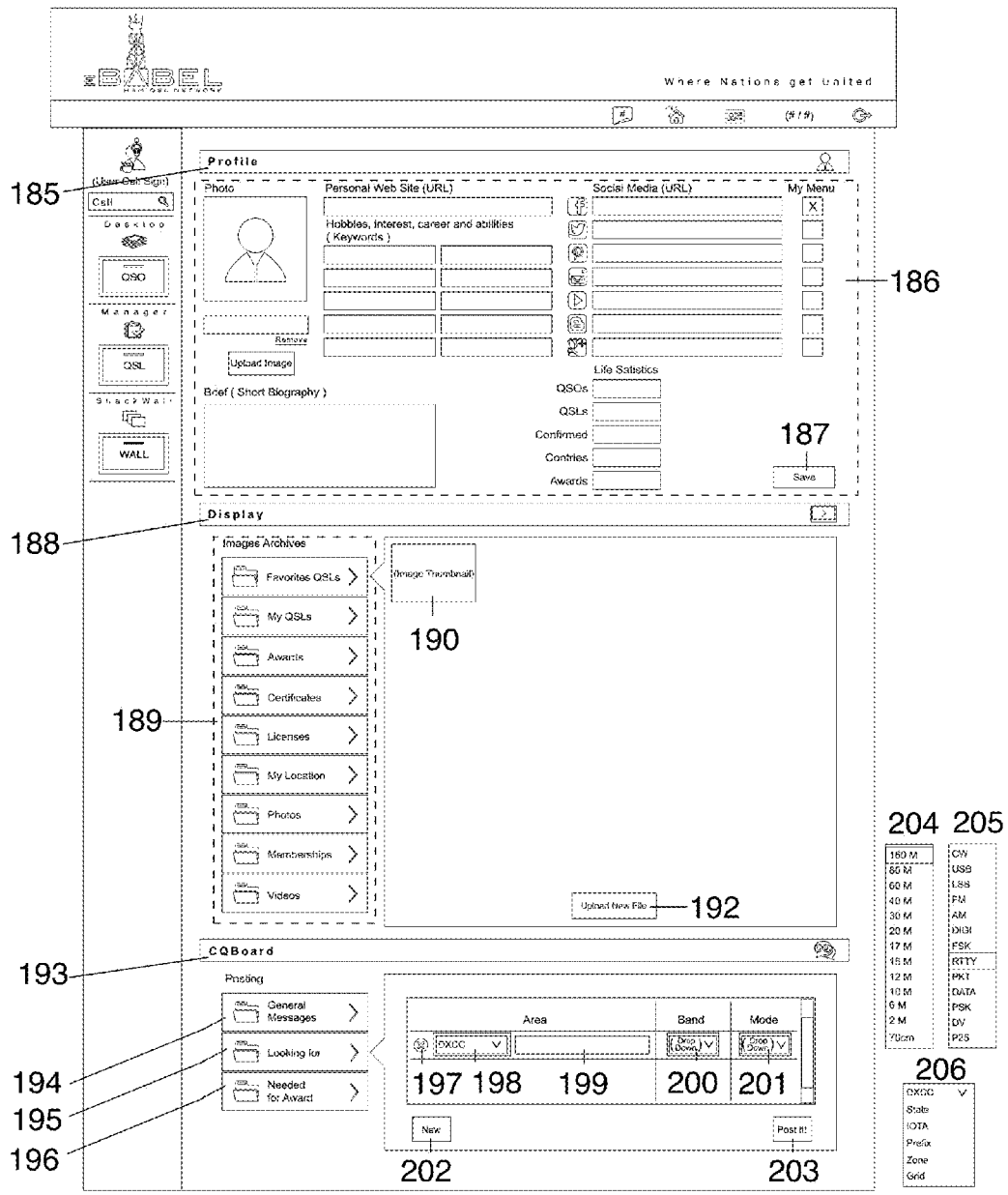
FIG. 24 illustrates the ShackWall User Setup Section layout window of the Graphical User Interface (GUI) of the system according to the present invention.

FIGS. 24 and 24a illustrate the ShackWall User Setup Section Layout. The ShackWall section is where the "Wall" or search results page is setup. The user could present the desire information in three (3) sub-sections: 1) Profile sub-section 185, where General Amateur Radio and Personal info as well as Social Media links are provided, 2) Display subsection 188 where Image Files are displayed and 3) CQBoard subsection, where a Bulletin board is provided to post messages and QSOs needed. Profile subsection 185 is provided with Info field 186 and a Save button 187 to save the information set. Display subsection 188 has a Folders categories area and an area for displaying Image thumbnails 190 in an image viewer 208. An upload button 192 is provided to upload new files to the folder. "Looking For" CQBoard Folder 195 allows the user to post any desire QSO wanted using pre-established categories. A Region filter dropdown 198 is provided to select a region from list 206. A text field 199 is also provided for allowing the user to write the name of the region. A Band filter dropdown 200 is provided to select a band from list 204 and a Mode filter dropdown 210 is provided to select a mode from list 205. A Delete button 197 is provided to delete the entry and a "New" button is provided to create a new post line. Also, a "Post It" button is provided to post the entries that will appear on the user's "Wall" section. A "General Messages" CQBoard Folder 194 is provided so that the user could post any desire message in a floating window 207 as well as a "Needed For Award" CQBoard Folder 196 provided so that the user could post the QSOs needed for any specific award.

Figure 25:
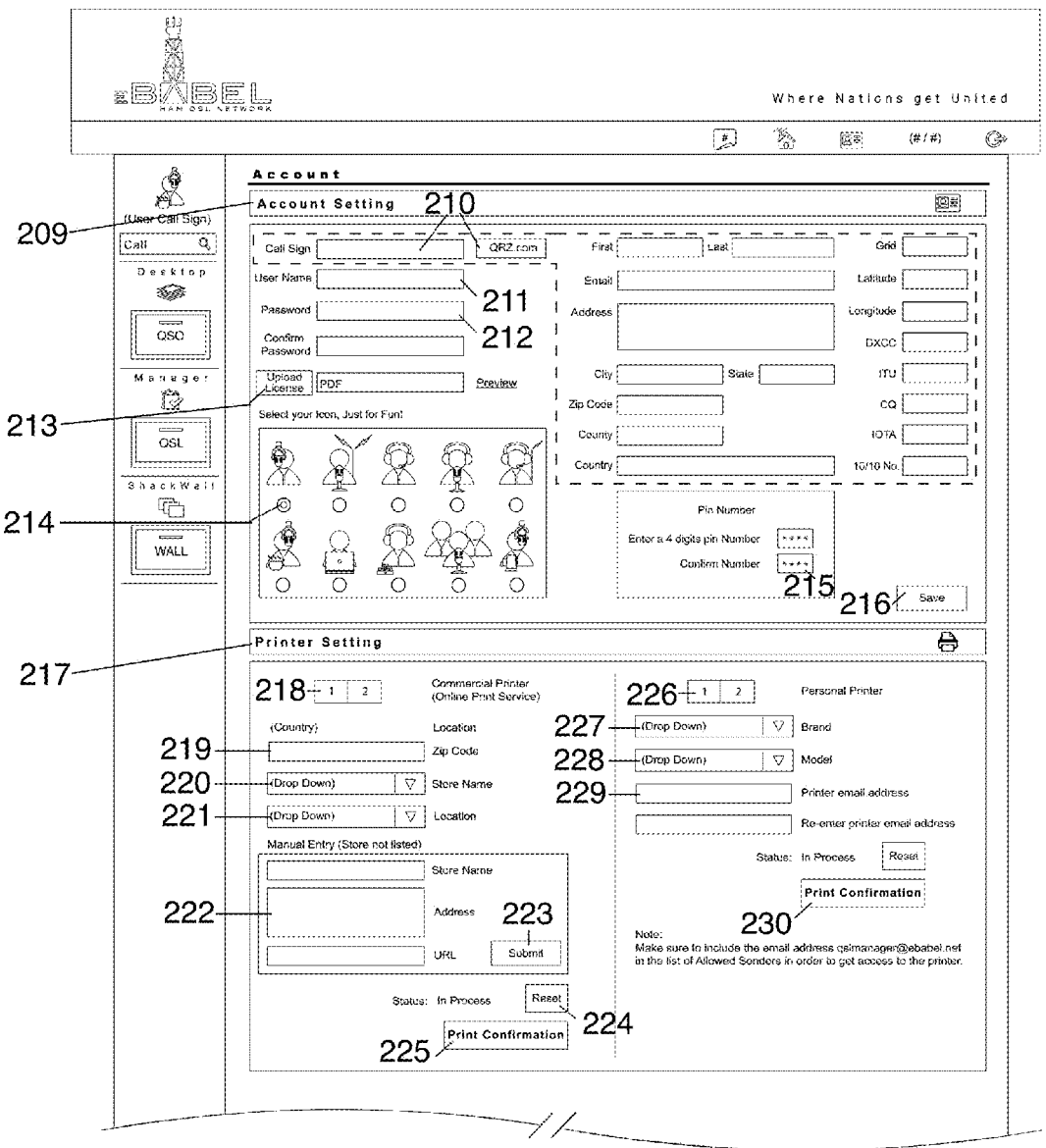
Figure 25A:
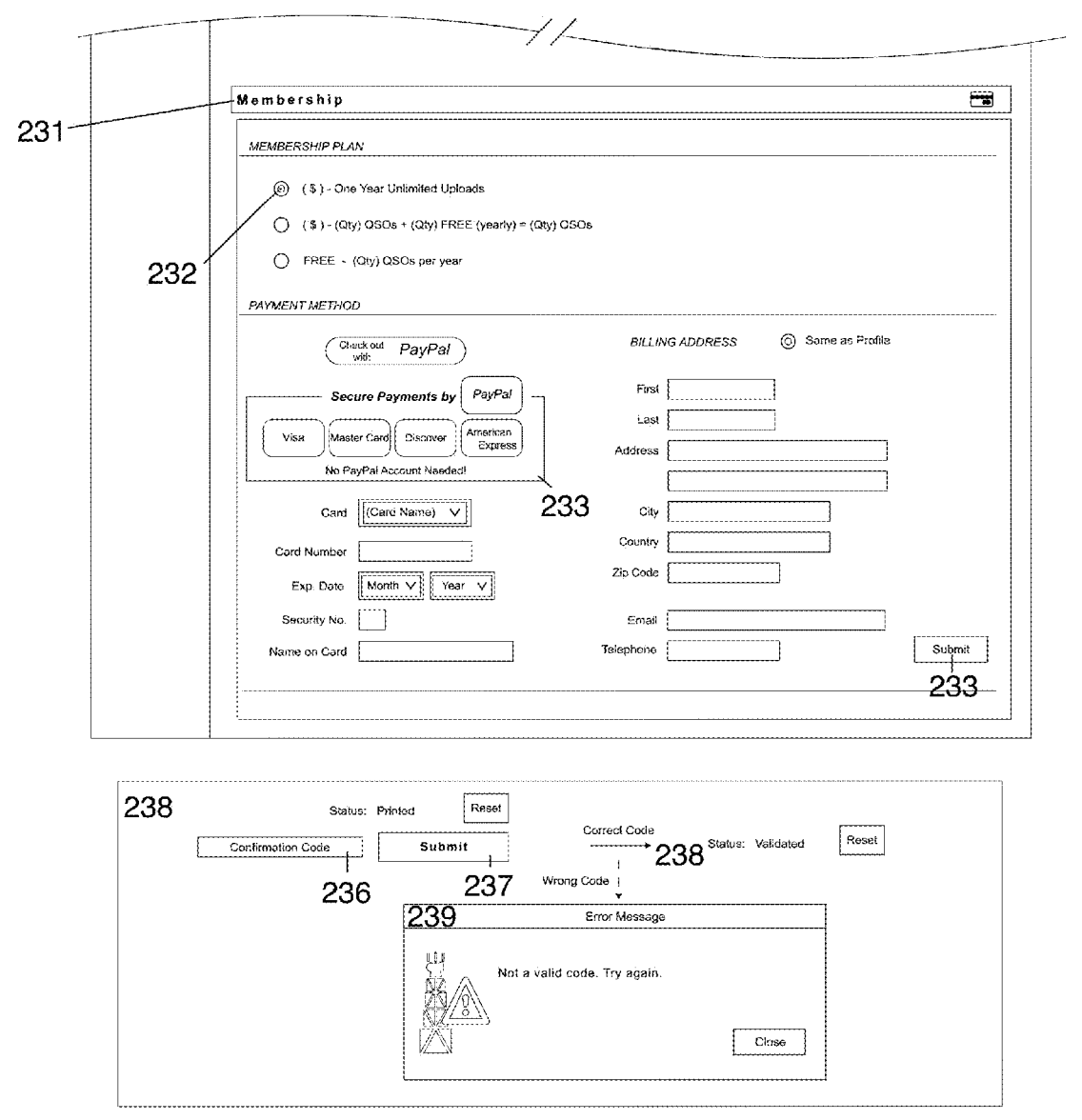
Figure 26:
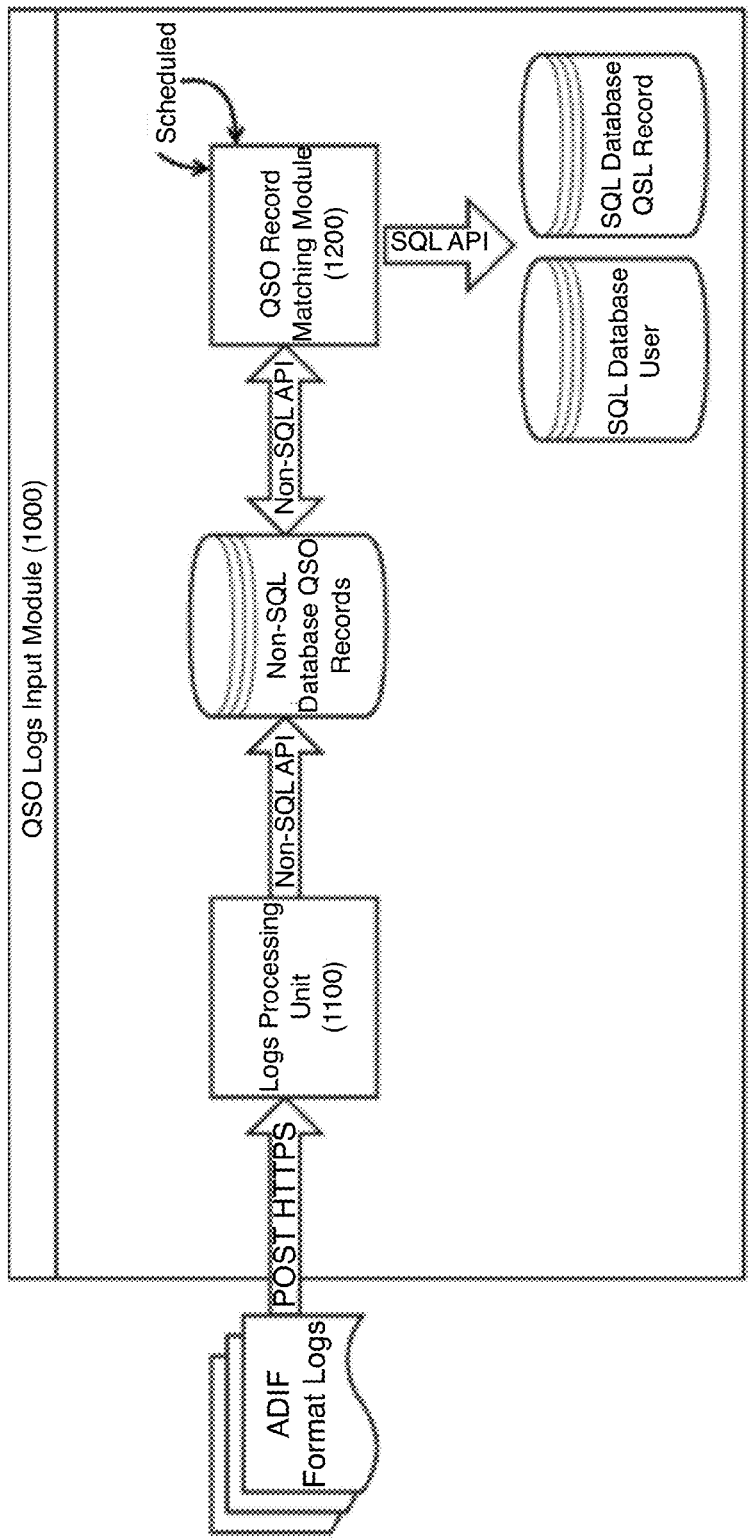
FIG. 26 illustrates the QSO Logs Input Module of the system architecture according to the present invention.
Figure 27:
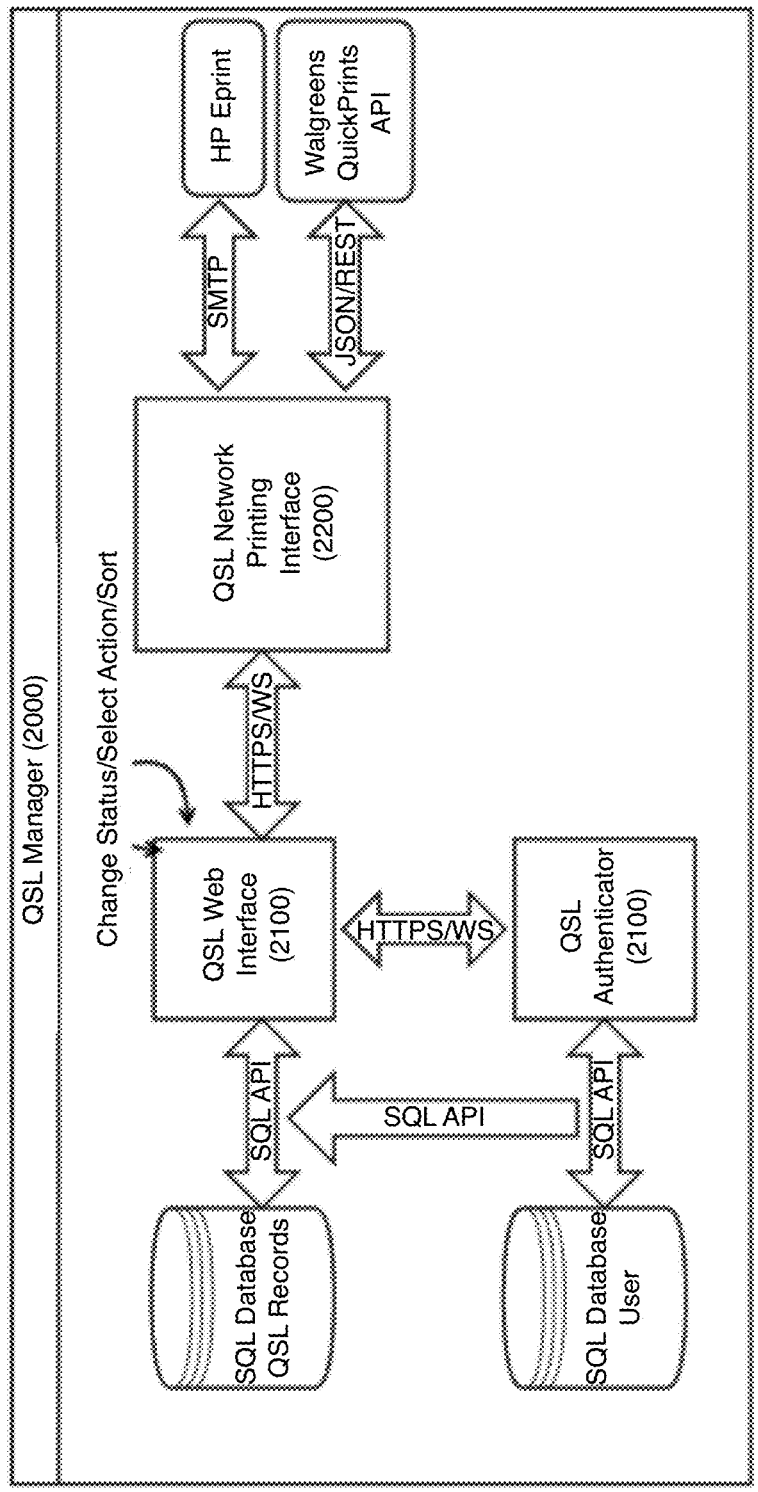
FIG. 27 illustrates the QSL Manager of the system architecture according to the present invention.
Figure 28:
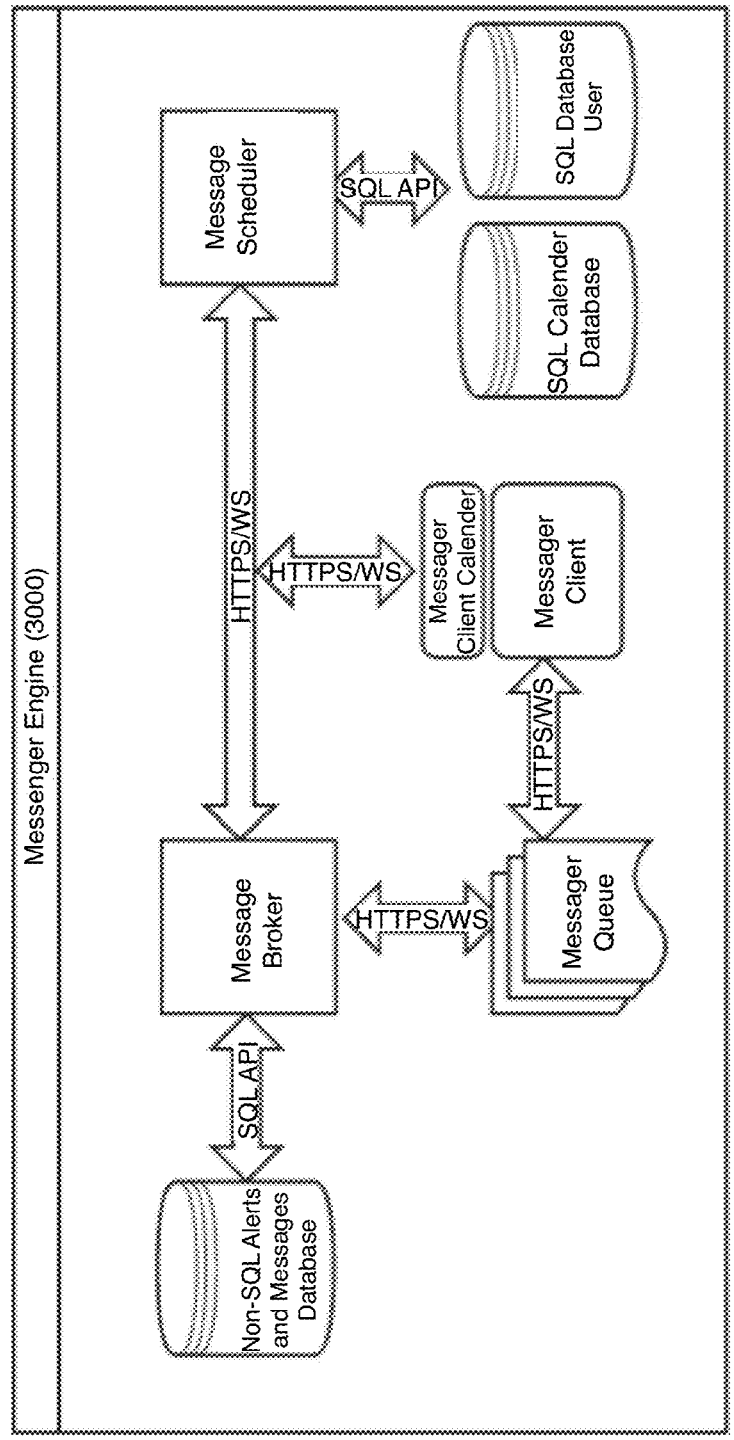
FIG. 28 illustrates the Messenger Engine of the system architecture according to the present invention.

FIGS. 25 and 25a illustrate the User Account Info Section Layout. The User Account section is divided in three (3) sections:

1) Account Settings section for Amateur Radio Operator info, license upload and Password and Personal Pin number setting, 2) Printer Setting section for printers configuration and validation. As part of setting up the account a commercial printer must be set. This commercial web account will be administrated by the eBabel System specifying the person that will receive the document (it is possible that multiple station receive QSLs in the same place under the same account). The system will send a confirmation via those printers creating a route. The user receives the document with the confirmation code. Then by entering this code to the system, in a specific period of time, validates the route. That means that the delivery is physically traceable. Once the station validated a commercial printer it could set up a personal printer, e.g. the HP ePrint service, using a combination of the validated route and the ePrint service, and 3) Membership section for choosing and paying for a membership plan.

A Call sign input and search command 210 is provided. The system will take the station information from the QRZ-.com database. If some information is missing or the station doesn't have any info at QRZ.com it could also be manually entered. Text field 211 is provided to set a desire user name and a text field 212 is provided to set the desire password that will have some specifications. An Upload License button 213 is provided to upload the Amateur Radio License to the eBabel server. The system will look in the PDF file that the information entered before matches the License info. Radio buttons 214 are provided to select a user icon to be display at the menus. It will also be the link to the user's wall. A PIN number area 215 is provided to set the Pin number. The user must create a four (4) digits encrypted pin number in order to authenticate their entries to the system, just like an electronic signature. A Save button 216 is provided to save the settings in the system. Printer selection buttons 218 are provided to select the printer position. The user could set two commercial printers and also two personal printers. Text field 219 is provided to enter the zip code of the commercial printer wanted. A dropdown menu 210 is provided to select a printing service company available in the area as well as a dropdown menu 221 to select the specific location of a store. In case there is no commercial printing service available in the provided list the user could ask the system administrator to create an account in the desire location using form 222 and submitting the petition to the system administrator via button 223. A Reset button 224 is provided to reset/erase the entire printer setup. Once the user setups the printer, the system will ask to print a confirmation 225 as shown in 238.

Personal printer selection buttons 226 are provided to select the personal printer position. A dropdown menu 227 is provided to choose the brand of the printer and another dropdown menu 228 is provided to choose the model of the printer. A text field 229 is provided to enter the email address of the printer. The major printers manufacturers offers the connection of their printers to the company network in order to bring the printer owner the capacity to print a documents remotely using the internet. The user has to setup an account with the manufacturer service in order to have this benefit. The user must set an email address in the mail company server. For example in the HP ePrint system the printer is connected to the HP server and any file sent to the email address, set by the user, will be printed automatically (with the owner permission). The archive (when comes from third parties emails) won't be save in the HP server. Once the user setups the printer, the system will ask to print a confirmation 230 as shown in 238.

Radio buttons 232 are provided to choose a membership plan. In a preferred embodiment, (3) plans are available:

One year unlimited uploads—The users could upload as many QSOs they want for one-year period.

Pay per Post—The users could pay for a quantity of QSOs to be uploaded. No time restriction in this plan. Example; 1000 QSOs for $24.99. The system will be continually subtracting to the remaining quantity until finish.

Free—This plan will give the user all the eBabel application functions. It let the user to upload a limited quantity of QSOs in a one-year period. Example: 200 QSOs per year.

The status of the membership will be visible at the main menu. In the unlimited uploads plan the information will be display as follow: (Days remaining) e.g. (250). In the pay per post plan: (QSOs remaining/QSOs credits paid) e.g. (825/1200) and in the free plan: (QSOs remaining/QSOs free) e.g. (80/200). Section 233 shows the accepted payment methods and a Submit button 233 is provided to submit the information.

Finally, text field 236 is provided to enter the confirmation code, wherein areas 237-239 show the process to submit the code and finish the printer validation.

This invention discloses a novel approach of the Multi-factor authentication systems domain applied to QSL Card authentication. The invention specifically uses a unique variation of the Two-Step Authentication method using network-connected printers. The factor used in this method is the "Something only the user has", in this case, a registered, local based network connected Printer. The System's Authentication Engine uses MD5 message-digest algorithms to produce a unique id per validation, per user. The generated confirmation number will be only available through the network-printing interface. Once printed, the User can interface the System in order to confirm the printed number, closing the Authentication process. The System implements a lightweight Messaging system in order to facilitate the messaging and events scheduling resulting from the stations users' interaction helping to achieve an easier and effective communication support. The invention implements the Network Printer Two-Step Authentication method using the general high-level architecture illustrated on FIGS. 26-33.

Figure 33:
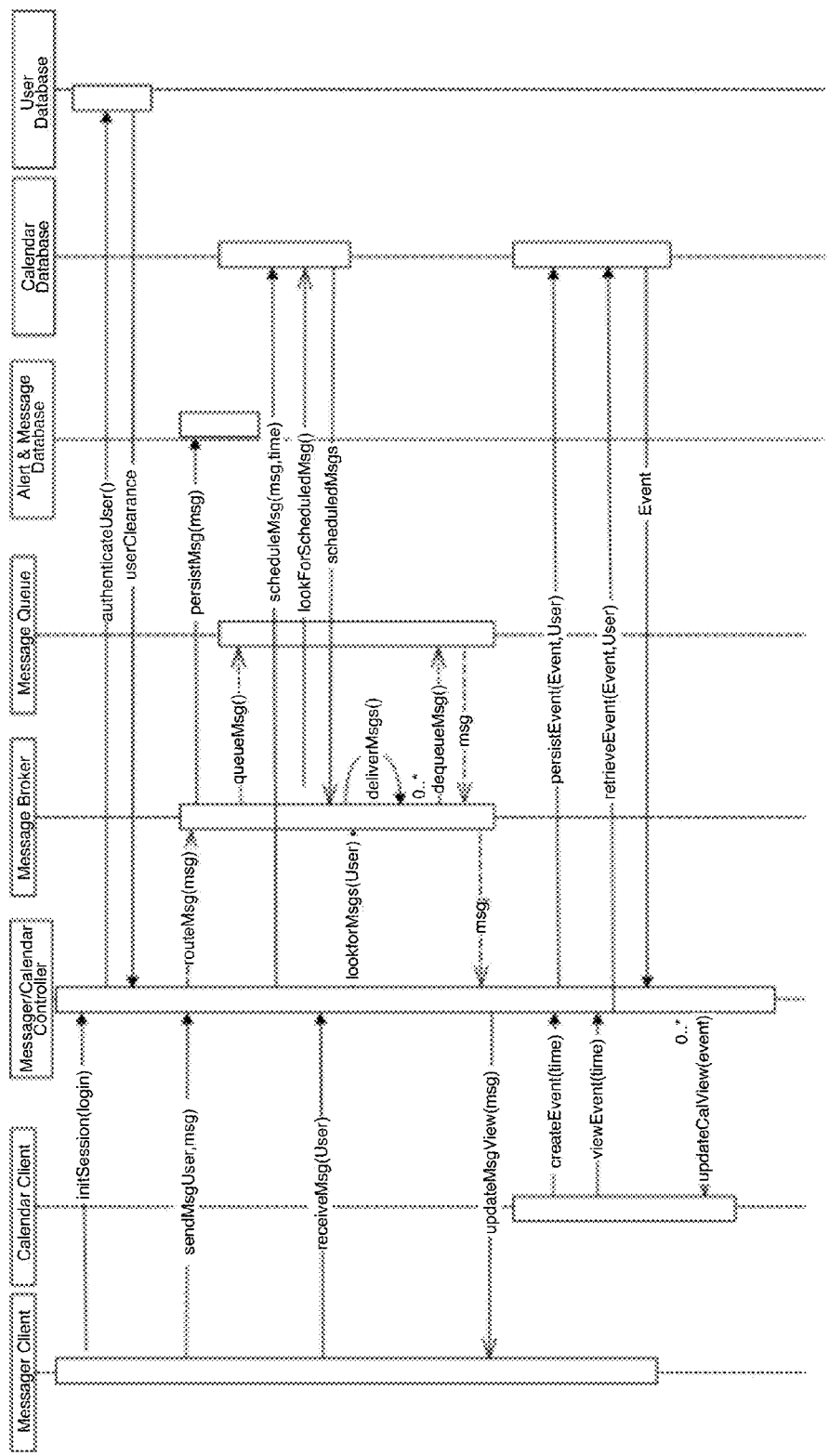
FIG. 33 shows the process for the Messenger and Calendar Engine of the system architecture according to the present invention.

QSO Logs Input Module Engine (1000) is responsible for fetching and persisting user's QSO records in ADIF format for the purpose of perform a blind match QSL records for further confirmation and validation. Once the QSL records are matched and being persisted the user can initiate the Authentication and Confirmation process. Records will be uploaded using HTTP POST over HTPPS 128 encryption for security. This engine will be using Non-SQL database technology to support the persistence a high volume of QSO records. It will also use SQL technology to ensure high speed and indexed SQL records for faster matching process. The QSL Manager (2000) System will be implemented via Web/Mobile Interface, Network Printer Interfaces and the QSL Authentication Engine as shown in the Figures. The network-printing Interface supports various network printing interface protocols such as but not limited to: HP ePrint (STMP) and Walgreens QuickPrints API JSON over REST. It also implements secure Web Services interfaces using HTPPS 128 bit encryption for security. The messenger Engine (3000) implements the entire communication and scheduling task either for users and other sub-system within the architecture as depicted in the Figures. This engine uses a set of REST over HTTPS 128 bit encryption for flexibility and security. It will also implement Message broker for asynchronous communication. It implements Non-SQL persistence for scalable and fast write mechanism. FIG. 33 illustrates the Messenger and Calendar Engine sequence diagram.

Systems and Sub-Systems

Log Processing Unit (1100)

Figure 29:
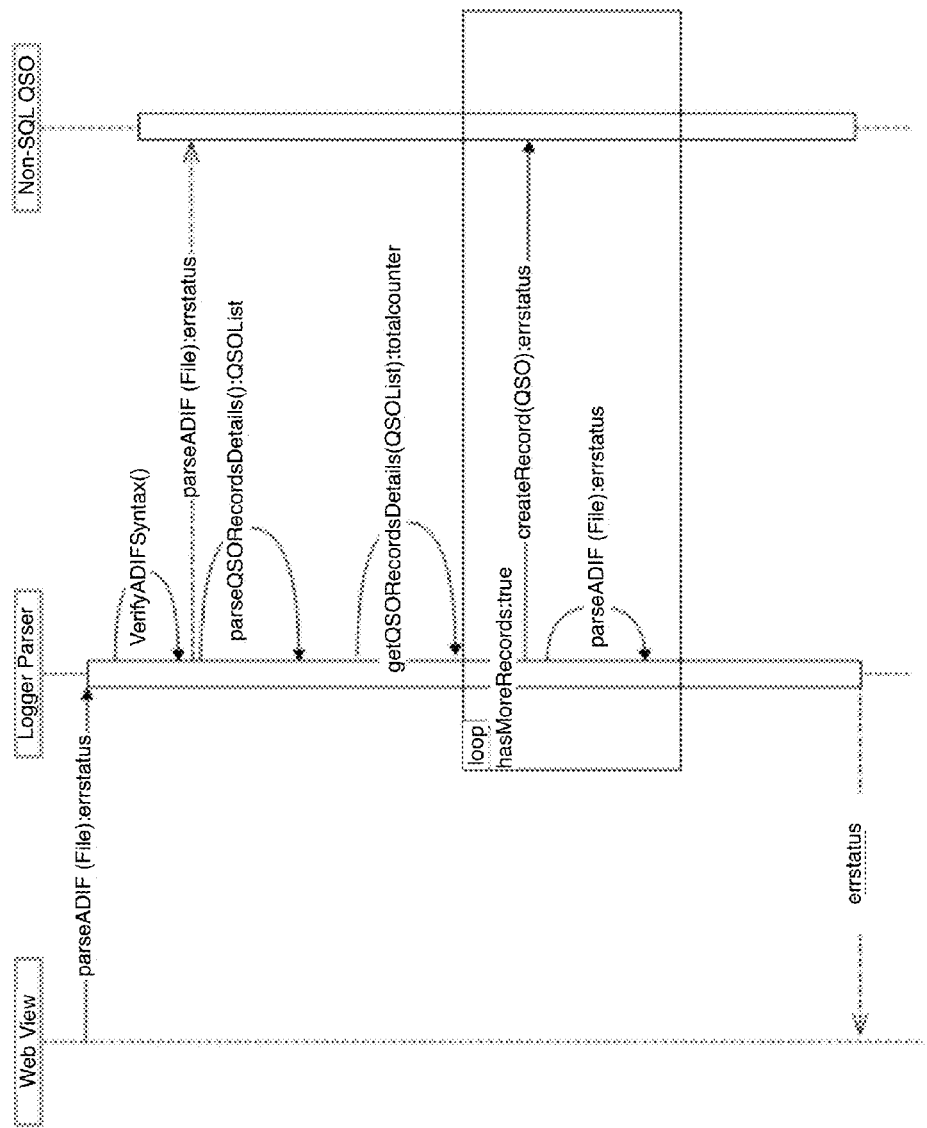
FIG. 29 shows the flow of uploading and persisting QSO records within the Log Processing sub-system of the system architecture according to the present invention.

This sub-system parses a file uploaded via HTTPS POST using the ADIF syntax. The sub-system is implemented as shown in FIG. 29, where the flow of uploading and persisting QSO records within the sub-system is illustrated.

QSO Record Matching Module (1200)

Figure 30:
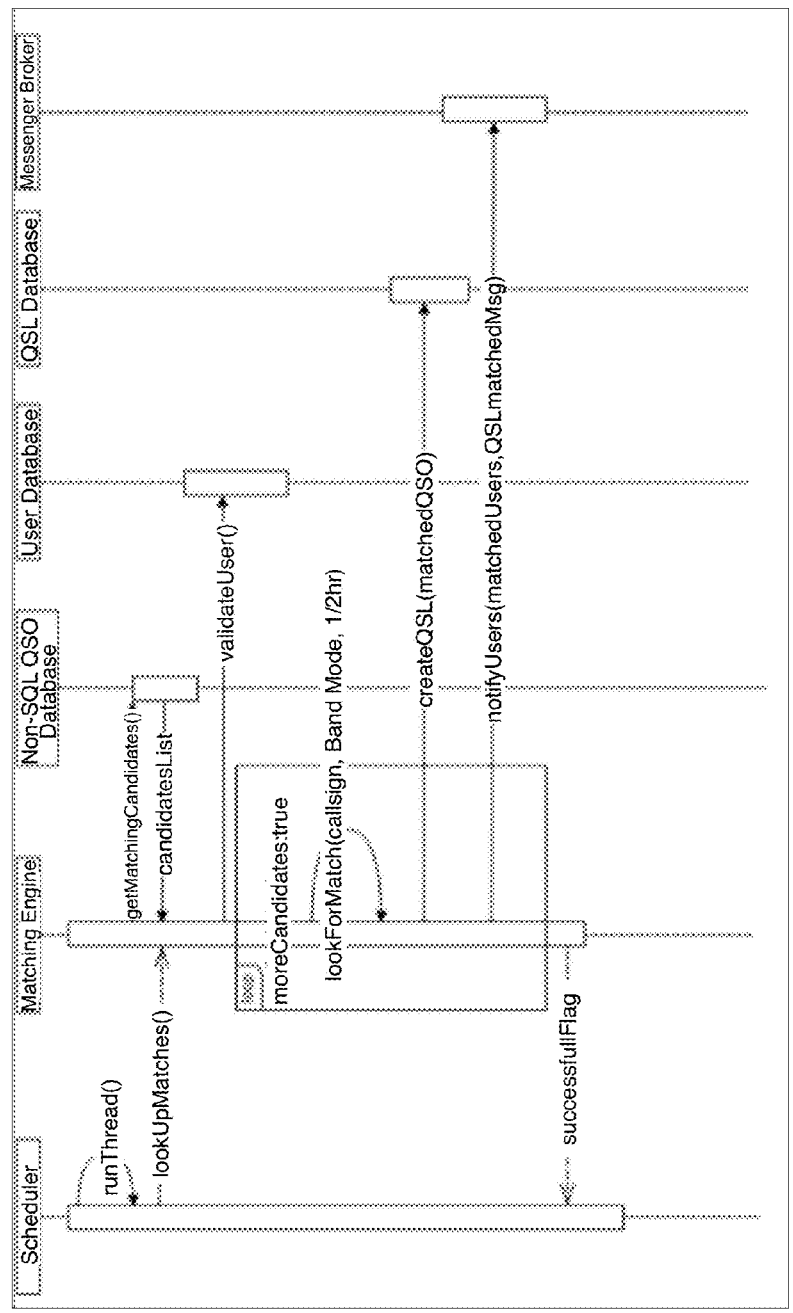
FIG. 30 shows the process for the QSO Record Matching Module sub-system of the system architecture according to the present invention.

This sub-system handles the blind matching process scheduler for QSO records utilizing the QSO records Call Sign, Band, Mode and Date and Time (UTC) having a +−½ hr time-frame window for the matching. Once a QSO recorded has been matched it will create a QSL record on status received; it will use alerts both users of the matching process respectively. FIG. 30 illustrates the sequence diagram in detail.

QSL Web Interface (2100)

This sub-system implements the logic regarding the QSL Authentication. The Web View initiates a session; the system validates user credentials and clearance the access within the module. The QSL Controller Web module then queries the date for all QSL associated to the authenticated user.

Figure 31:
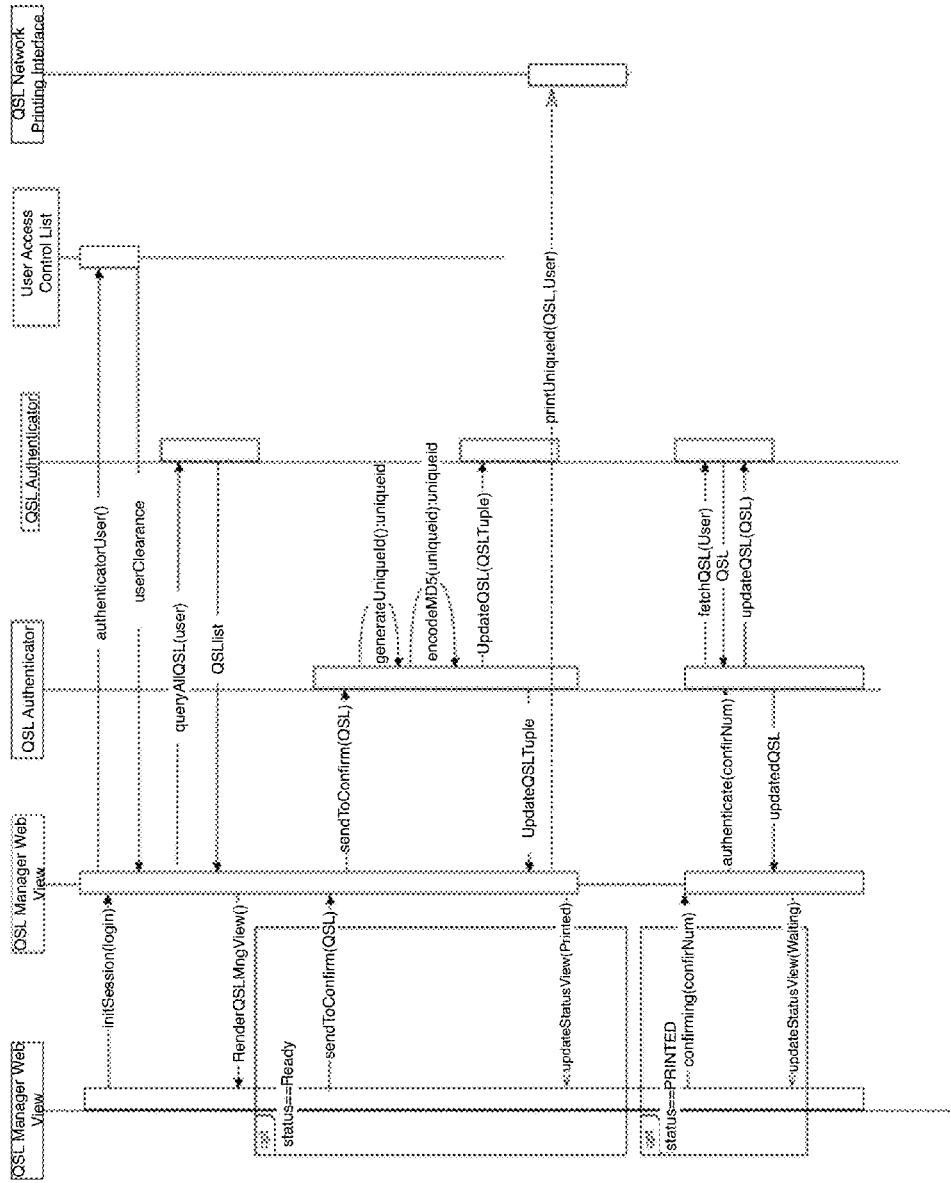
FIG. 31 shows the actions performed in order to evoke status changes of the system architecture according to the present invention.

Performing actions in order to evoke status changes, more specific in this case, initiate two use cases as shown in FIG. 31:

1. Action==Send and Status==READY the user is initiating a validation process. This will begin the confirmation process within the Controller module and will invoke the QSL (2100)'s methods for unique hash id generation and MD5 encoding. A QSL tuple entity will be generated. The purpose of this tuple is to have both stations QSL status centered for later transaction/status clearance. Once the confirmation code has been created the system will automatically and asynchronously call the QSL Network Printing Interface for the physical impression. The QSL or QSL list worked status will be updated at the manager's view to Printed.

2. Action==Send and Status==Printed invocation will send users entered confirmation number through the HTTPS interface. The controller then will validated this number and in case of a successful validation will update the QSL's status(es) waiting confirmation until the members of the QSL tuple has both confirmed the successfully the code. Then both QSL statuses within the tuple will be changed to confirmed. The nature of the last tuple status change is asynchronous.

QSL Network Printing Web Interface (2200)

Figure 32:
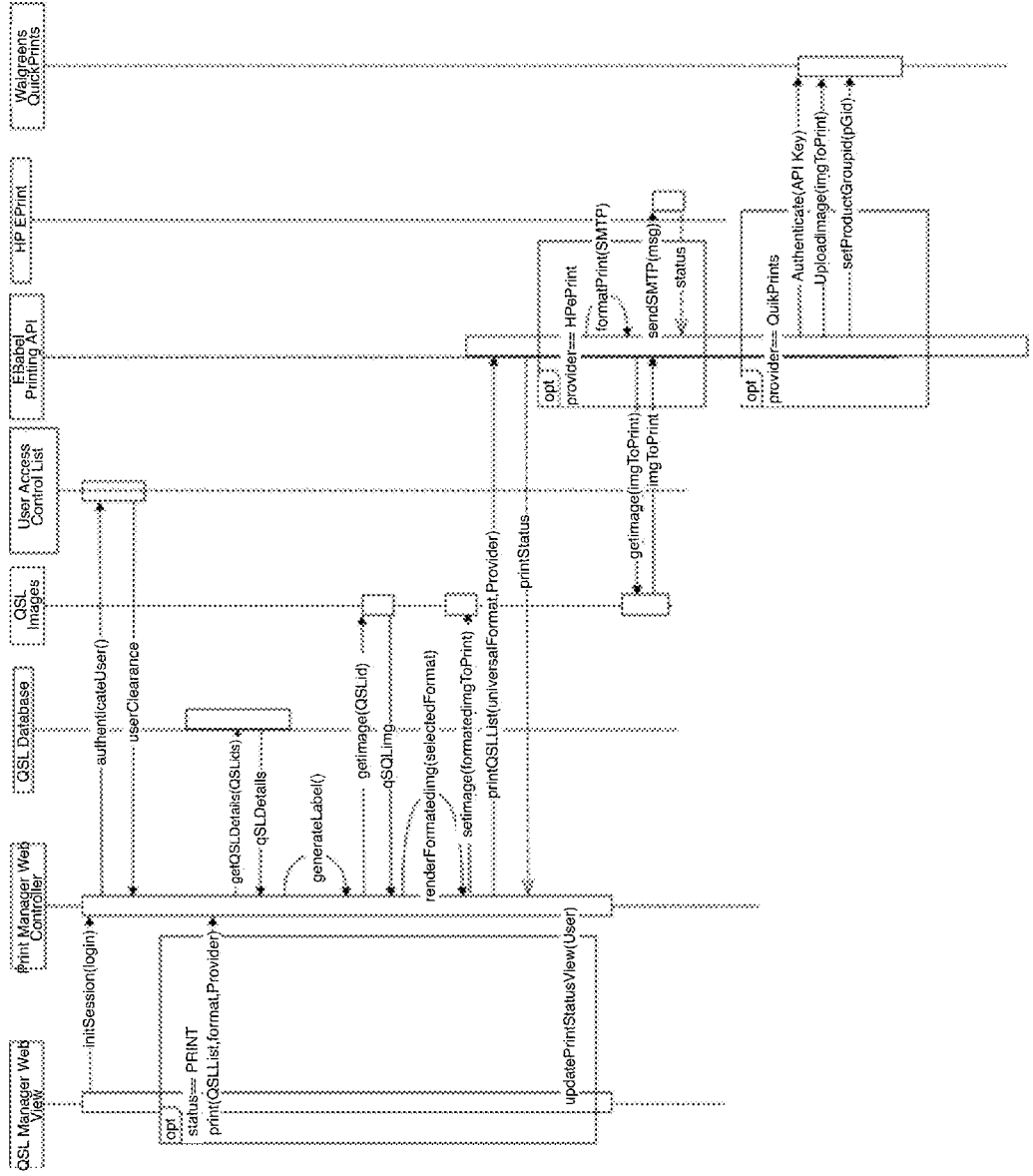
FIG. 32 shows the process for the QSL Network Printing Web Interface of the system architecture according to the present invention.

This sub-system will implement the logic regarding the Network Printing Interface, which will support various connectors. At this point it supports STMP ePrint style as well as JSON/REST Walgreens API. Once the QSL has been confirmed, it can be printed through the print action within the QSL Web Manager View. The QSL Print Web View will handle the format and provider to select; giving the flexibility to the user to select from Full Front, Back Label or Text Report card choices as well as supported quality printing options such printer quality or commercial product groups. The Authenticated user selects the format, provider with options and quantity; all parameters will be encapsulated within the format, user and provider objects. The Controller will then generates the labels, fetch for images to uses from the QSL image configuration module. Render the images to print accordingly. Create a new image object with the design to print. Then evoke eBabel Print API with the Provider and image url. With the API, which is acting as a provider normalizer, will load the correspondent interface for the giving provider. In the case of ePrint will encode a SMTP message and will send to the mail to the Printing service. In the case of Walgreen's, will then authenticate the API, upload the image url and set the proper product and quantity to print. Asynchronously, it will update the view to reflect the printing provider status when available. This process is illustrated in FIG. 32.

Although the present invention has been described herein with reference to the foregoing exemplary embodiment, this embodiment does not serve to limit the scope of the present invention. Accordingly, those skilled in the art to which the present invention pertains will appreciate that various modifications are possible, without departing from the technical spirit of the present invention.

I claim:

1. A QSL card confirmation system comprising:
   a central server configured to receive logbook data from at least two Amateur Radio stations user computers, said central server comprising:
   a matching unit comparing said logbook data to determine a logbook data match, wherein said logbook data includes at least one of: stations call signs, radio frequency band, operating mode, and date and time of a contact;
   a QSL Card generating unit generating a QSL Card based on said logbook data match, wherein said QSL Card contains information related to a communication between said at least two Amateur Radio stations user computers;
   a Manager unit receiving said QSL Card and displaying said QSL card to each of said at least two Amateur Radio stations user computers;
   at least one network-connected printer previously registered and validated with the system receiving and printing said QSL card, wherein said printed QSL card contains a confirmation indicia unique to the communication between said at least two Amateur Radio stations user computers;
   a confirmation code receiving unit receiving from each at least two Amateur Radio stations user computers said unique confirmation indicia and a security identifier previously registered and unique to each Amateur Radio stations user; and
   a QSL confirmation unit confirming the communication between said at least two Amateur Radio stations users and allowing a digital version of said QSL card to be downloaded to a user's computer.

2. The QSL card confirmation system of claim 1, wherein said logbook data is in ADIF format.

3. The QSL card confirmation system of claim 1, wherein said printed QSL Card further includes a confirmation status indicia.

4. The QSL card confirmation system of claim 3, wherein said confirmation status indicia comprises: a pending status, a confirmed status or a courtesy status.

5. The QSL card confirmation system of claim 1, wherein the confirmation indicia of said printed QSL card is printed on at least one of: a predefined label template and a predefined card layout.

6. The QSL card confirmation system of claim 5, wherein said predefined card layout further includes at least one of: an image or a photo.

7. The QSL card confirmation system of claim 1, wherein the information related to a communication between said at least two Amateur Radio stations user computers includes at least one of: a specific band and mode where the communication took place, a recipient call sign ID, Date/UTS, RST, a barcode and a Message.

8. The QSL card confirmation system of claim 1, wherein said confirmation indicia comprise at least one of: a barcode and alphanumeric characters.

9. The QSL card confirmation system of claim 1, wherein said QSL confirmation unit further allows re-printing said QSL card showing a confirmed status.

10. The QSL card confirmation system of claim 1, wherein said confirmation code receiving unit provides a confirmed output when said unique confirmation indicia received from each at least two Amateur Radio stations user computers is matched and said security identifier previously registered and unique to each Amateur Radio stations user is also matched.

11. The QSL card confirmation system of claim 1, wherein said network-connected printer is connected via Internet.

12. A method of confirming a QSL card comprising:
   uploading to a central server logbook data from Amateur Radio stations user computers, said logbook data related to communications between Amateur Radio stations users and including at least one of: stations call signs, radio frequency band, operating mode, and date and time of a contact;
   comparing said logbook data to determine a logbook data match between at least two Amateur Radio stations users;
   generating a QSL Card based on said logbook data match;
   printing said QSL Card on a previously registered and validated network-connected printer, wherein said printed QSL card contains a confirmation indicia unique to the communication between said at least two Amateur Radio stations users;
   providing to the server said confirmation indicia from each at least two Amateur Radio stations user and a security identifier previously registered and unique to each Amateur Radio stations user; and
   confirming the communication between said at least two Amateur Radio stations users by providing a confirmed QSL card and allowing a digital version of said confirmed QSL card to be downloaded to a user's computer.

13. The method of confirming a QSL card of claim 12, wherein said logbook data is in ADIF format.

14. The method of confirming a QSL card of claim 12, wherein said printed QSL Card further includes a confirmation status indicia.

15. The method of confirming a QSL card of claim 14, wherein said confirmation status indicia comprises: a pending status, a confirmed status or a courtesy status.

16. The method of confirming a QSL card of claim 12, wherein the confirmation indicia of said printed QSL card is printed on at least one of: a predefined label template and a predefined card layout.

17. The method of confirming a QSL card of claim 16, wherein said predefined card layout further includes at least one of: an image or a photo.

18. The method of confirming a QSL card of claim 12, wherein said generated QSL Card contains information related to a communication between said at least two Amateur Radio stations user computers, said information including at least one of: a specific band and mode where the communication took place, a recipient call sign ID, Date/UTS, RST, a barcode and a Message.

19. The method of confirming a QSL card of claim 12, wherein said confirmation indicia comprise at least one of: a barcode and alphanumeric characters.

20. The method of confirming a QSL card of claim 12, further allowing a digital version of said QSL card showing a confirmed status to be downloaded to a user's computer.

21. The method of confirming a QSL card of claim 12, further allowing re-printing said QSL card showing a confirmed status.

22. The method of confirming a QSL card of claim 12, wherein said communication is confirmed if said unique confirmation indicia received from each at least two Amateur Radio stations user computers is matched and said security identifier previously registered and unique to each Amateur Radio stations user is also matched.

23. The method of confirming a QSL card of claim 12, wherein said network-connected printer is connected via Internet.

24. A method of confirming a QSL card comprising:
validating a first time a communication between at least two Amateur Radio stations users by comparing their logbook data and providing a confirmation indicia when a logbook data match between said at least two Amateur Radio stations users is determined, wherein said logbook data includes at least one of: stations call signs, radio frequency band, operating mode, and date and time of the contact;
validating a second time a communication between said at least two Amateur Radio stations users by printing a QSL Card on a previously registered and validated network-connected printer, wherein said printed QSL card contains said confirmation indicia unique to the communication between said at least two Amateur Radio stations users; and
validating a third time a communication between said at least two Amateur Radio stations users by providing to said server said confirmation indicia and a security identifier previously registered and unique to each Amateur Radio stations user, said QSL card is validated only when the communication between said at least two Amateur Radio stations users is validated said first, second and third time.

25. The method of confirming a QSL card of claim 24, wherein said logbook data is in ADIF format.

26. The method of confirming a QSL card of claim 24, wherein said printed QSL Card further includes a confirmation status indicia.

27. The method of confirming a QSL card of claim 26, wherein said confirmation status indicia comprises: a pending status, a confirmed status or a courtesy status.

28. The method of confirming a QSL card of claim 24, wherein the confirmation indicia of said printed QSL card is printed on at least one of: a predefined label template and a predefined card layout.

29. The method of confirming a QSL card of claim 28, wherein said predefined card layout further includes at least one of: an image or a photo.

30. The method of confirming a QSL card of claim 24, wherein said printed QSL Card further contains information related to a communication between said at least two Amateur Radio stations user computers, said information including at least one of: a specific band and mode where the communication took place, a recipient call sign ID, Date/UTS, RST, a barcode and a Message.

31. The method of confirming a QSL card of claim 24, wherein said confirmation indicia comprise at least one of: a barcode and alphanumeric characters.

32. The method of confirming a QSL card of claim 24, further allowing a digital version of said QSL card showing a confirmed status to be downloaded to a user's computer once the communication is confirmed.

33. The method of confirming a QSL card of claim 24, further allowing re-printing said QSL card showing a confirmed status once the communication is confirmed.

34. The method of confirming a QSL card of claim 24, wherein said communication is validated by third time if said unique confirmation indicia received from each at least two Amateur Radio stations user computers is matched and said security identifier previously registered and unique to each Amateur Radio stations user is also matched.

35. The method of confirming a QSL card of claim 24, wherein said network-connected printer is connected via Internet.

36. A QSL card confirmation system comprising:
a server configured to receive logbook data from Amateur Radio stations user computers, said server comprising:
a matching unit comparing said logbook data to determine a logbook data match, wherein said logbook data includes at least one of: stations call signs, radio frequency band, operating mode, and date and time of a contact;
a QSL Card generating unit generating a QSL Card based on said logbook data match, wherein said QSL Card contains information related to a communication between at least two Amateur Radio stations user computers;
a QSl Card printing unit sending to print said QSl Card to at least one printer, wherein said printed QSL card contains a confirmation indicia unique to the communication between said at least two Amateur Radio stations user computers;
a confirmation code receiving unit receiving from each said at least two Amateur Radio stations user computers said unique confirmation indicia and a security identifier previously registered and unique to each Amateur Radio stations user; and
a QSL confirmation unit confirming the communication between said at least two Amateur Radio stations users based on a confirmed output of said confirmation code receiving unit.

37. The QSL card confirmation system of claim 36, wherein said at least one printer is a network-connected printer.

38. The QSL card confirmation system of claim 36, wherein said logbook data is in ADIF format.

39. The QSL card confirmation system of claim 36, wherein said printed QSL Card further includes a confirmation status indicia.

40. The QSL card confirmation system of claim 39, wherein said confirmation status indicia comprises: a pending status, a confirmed status or a courtesy status.

41. The QSL card confirmation system of claim 36, wherein the confirmation indicia of said printed QSL card is printed on at least one of: a predefined label template and a predefined card layout.

42. The QSL card confirmation system of claim 41, wherein said predefined card layout further includes at least one of: an image or a photo.

43. The QSL card confirmation system of claim 36, wherein the information related to a communication between said at least two Amateur Radio stations user computers includes at least one of: a specific band and mode where the communication took place, a recipient call sign ID, Date/UTS, RST, a barcode and a Message.

44. The QSL card confirmation system of claim 36, wherein said confirmation indicia comprise at least one of: a barcode and alphanumeric characters.

45. The QSL card confirmation system of claim 36, wherein said QSL confirmation unit further allows re-printing said QSL card showing a confirmed status.

46. The QSL card confirmation system of claim 36, wherein said confirmation code receiving unit provides a confirmed output when said unique confirmation indicia received from each at least two Amateur Radio stations user computers is matched and said security identifier previously registered and unique to each Amateur Radio stations user is also matched in the system.

47. The QSL card confirmation system of claim 36, wherein said at least one printer is connected via Internet.

48. The QSL card confirmation system of claim 36, wherein said at least one printer is previously registered and validated with the system.

49. A method of confirming a QSL card comprising:
receiving at a server logbook data from Amateur Radio stations user computers, said logbook data related to communications between Amateur Radio stations users and including at least one of: stations call signs, radio frequency band, operating mode, and date and time of the contact;
comparing said logbook data to determine a logbook data match between at least two Amateur Radio stations users;
generating a QSL Card based on said logbook data match;
sending to print said QSL Card on at least one printer, wherein said printed QSL card contains a confirmation indicia unique to the communication between said at least two Amateur Radio stations users;
receiving at said server said confirmation indicia from each said at least two Amateur Radio stations user and a security identifier previously registered and unique to each Amateur Radio stations user; and
confirming the communication between said at least two Amateur Radio stations users based on said confirmation indicia and said security identifiers.

50. The method of confirming a QSL card of claim 49, wherein said at least one printer is connected via Internet.

51. The method of confirming a QSL card of claim 49, wherein said at least one printer is previously registered and validated in the system.

52. The method of confirming a QSL card of claim 49, wherein said at least one printer is a network-connected printer.

53. The method of confirming a QSL card of claim 49, wherein said logbook data is in ADIF format.

54. The method of confirming a QSL card of claim 49, wherein said printed QSL Card further includes a confirmation status indicia.

55. The method of confirming a QSL card of claim 54, wherein said confirmation status indicia comprises: a pending status, a confirmed status or a courtesy status.

56. The method of confirming a QSL card of claim 49, wherein the confirmation indicia of said printed QSL card is printed on at least one of: a predefined label template and a predefined card layout.

57. The method of confirming a QSL card of claim 56, wherein said predefined card layout further includes at least one of: an image or a photo.

58. The method of confirming a QSL card of claim 49, wherein said generated QSL Card contains information related to a communication between said at least two Amateur Radio stations user computers, said information including at least one of: a specific band and mode where the communication took place, a recipient call sign ID, Date/UTS, RST, a barcode and a Message.

59. The method of confirming a QSL card of claim 49, wherein said confirmation indicia comprise at least one of: a barcode and alphanumeric characters.

60. The method of confirming a QSL card of claim 49, further allowing a digital version of said QSL card showing a confirmed status to be downloaded to a user's computer.

61. The method of confirming a QSL card of claim 49, further allowing re-printing said QSL card showing a confirmed status.

62. The method of confirming a QSL card of claim 49, wherein said communication is confirmed if said unique confirmation indicia received from each said at least two Amateur Radio stations user computers is matched and said security identifier previously registered and unique to each Amateur Radio stations user is also matched in the system.

63. A method of confirming a QSL card comprising:
sending to a server logbook data from an Amateur Radio station user computer, said logbook data related to communications between Amateur Radio stations users and including at least one of: stations call signs, radio frequency band, operating mode, and date and time of the contact;
receiving a QSL Card generated based on a comparison between said logbook data to determine a logbook data match between at least two Amateur Radio stations users;
instructing said server to print said QSL Card on a printer, wherein said printed QSL card contains a confirmation indicia unique to the communication between said at least two Amateur Radio stations users;
providing to said server said confirmation indicia and a security identifier previously registered and unique to each Amateur Radio stations user; and
obtaining from said server a confirmation of the communication between said at least two Amateur Radio stations users based on said confirmation indicia and said security identifier.

64. The method of confirming a QSL card of claim 63, wherein said printer is connected via Internet.

65. The method of confirming a QSL card of claim 63, wherein said printer is previously registered and validated in the system.

66. The method of confirming a QSL card of claim 63, wherein said printer is a network-connected printer.

67. The method of confirming a QSL card of claim 63, wherein said logbook data is in ADIF format.

68. The method of confirming a QSL card of claim 63, wherein said printed QSL Card further includes a confirmation status indicia.

69. The method of confirming a QSL card of claim 68, wherein said confirmation status indicia comprises: a pending status, a confirmed status or a courtesy status.

70. The method of confirming a QSL card of claim 63, wherein the confirmation indicia of said printed QSL card is printed on at least one of: a predefined label template and a predefined card layout.

71. The method of confirming a QSL card of claim 70, wherein said predefined card layout further includes at least one of: an image or a photo.

72. The method of confirming a QSL card of claim 63, wherein said generated QSL Card contains information related to a communication between said at least two Amateur Radio stations user computers, said information including at least one of: a specific band and mode where the communication took place, a recipient call sign ID, Date/UTS, RST, a barcode and a Message.

73. The method of confirming a QSL card of claim 63, wherein said confirmation indicia comprise at least one of: a barcode and alphanumeric characters.

74. The method of confirming a QSL card of claim 63, further downloading to a user's computer a digital version of said QSL card showing a confirmed status.

75. The method of confirming a QSL card of claim 63, further instructing said server to re-print said QSL card showing a confirmed status.

76. The method of confirming a QSL card of claim 63, wherein said communication is confirmed if said unique confirmation indicia received from each said at least two Amateur Radio stations user computers is matched and said security identifier previously registered and unique to each Amateur Radio stations user is also matched in the system.

* * * * *